Figure 1:
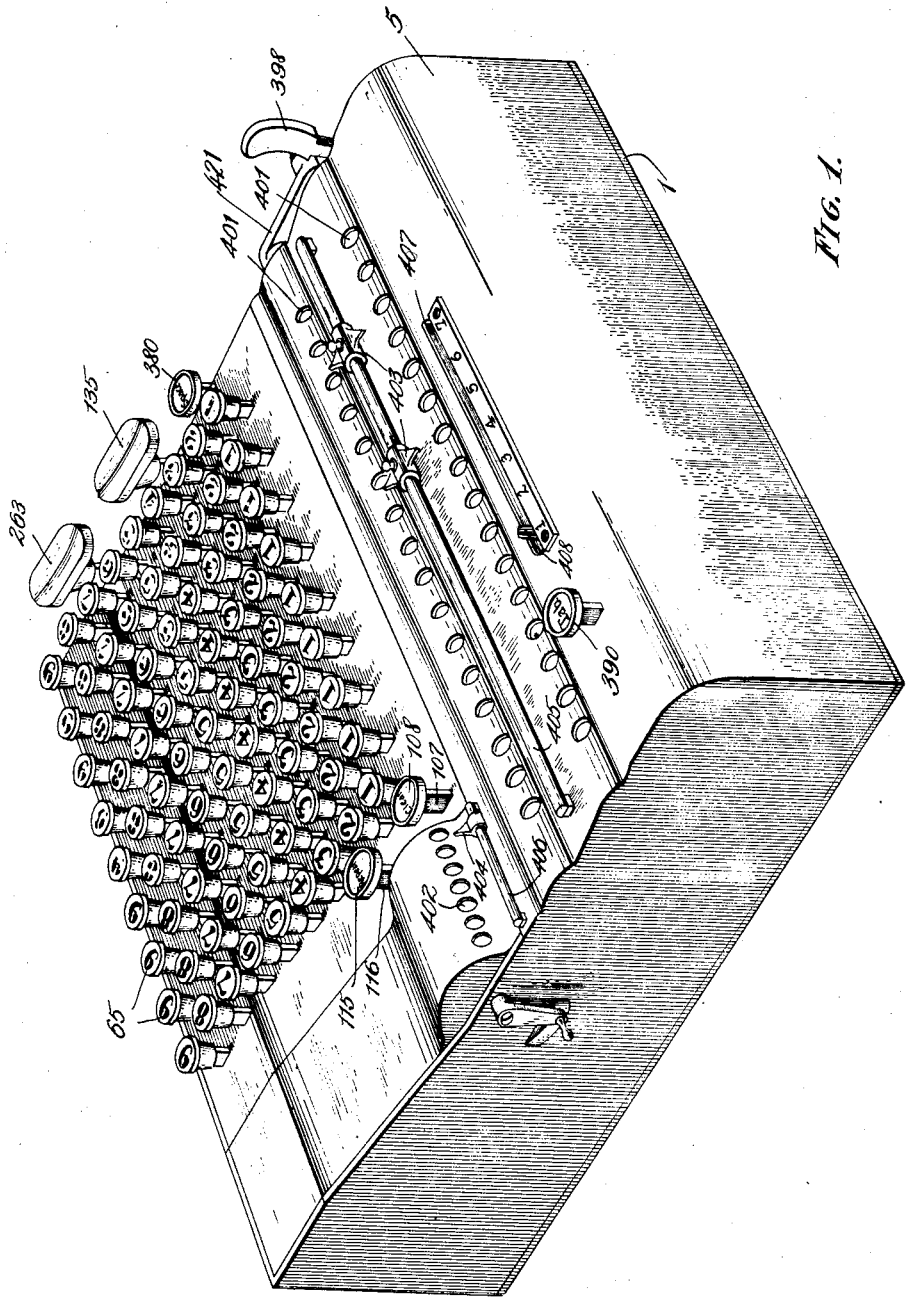

A. S. DENNIS.
CALCULATING MACHINE.
APPLICATION FILED SEPT. 18, 1915.

1,356,605.

Patented Oct. 26, 1920.
12 SHEETS—SHEET 2.

WITNESSES:
R. L. Bruck.
H. Norberg

INVENTOR,
Adolphus S. Dennis,
By Hull, Smith, Brock & West
Att'ys.

A. S. DENNIS.
CALCULATING MACHINE.
APPLICATION FILED SEPT. 18, 1915.
1,356,605.
Patented Oct. 26, 1920.
12 SHEETS—SHEET 4.
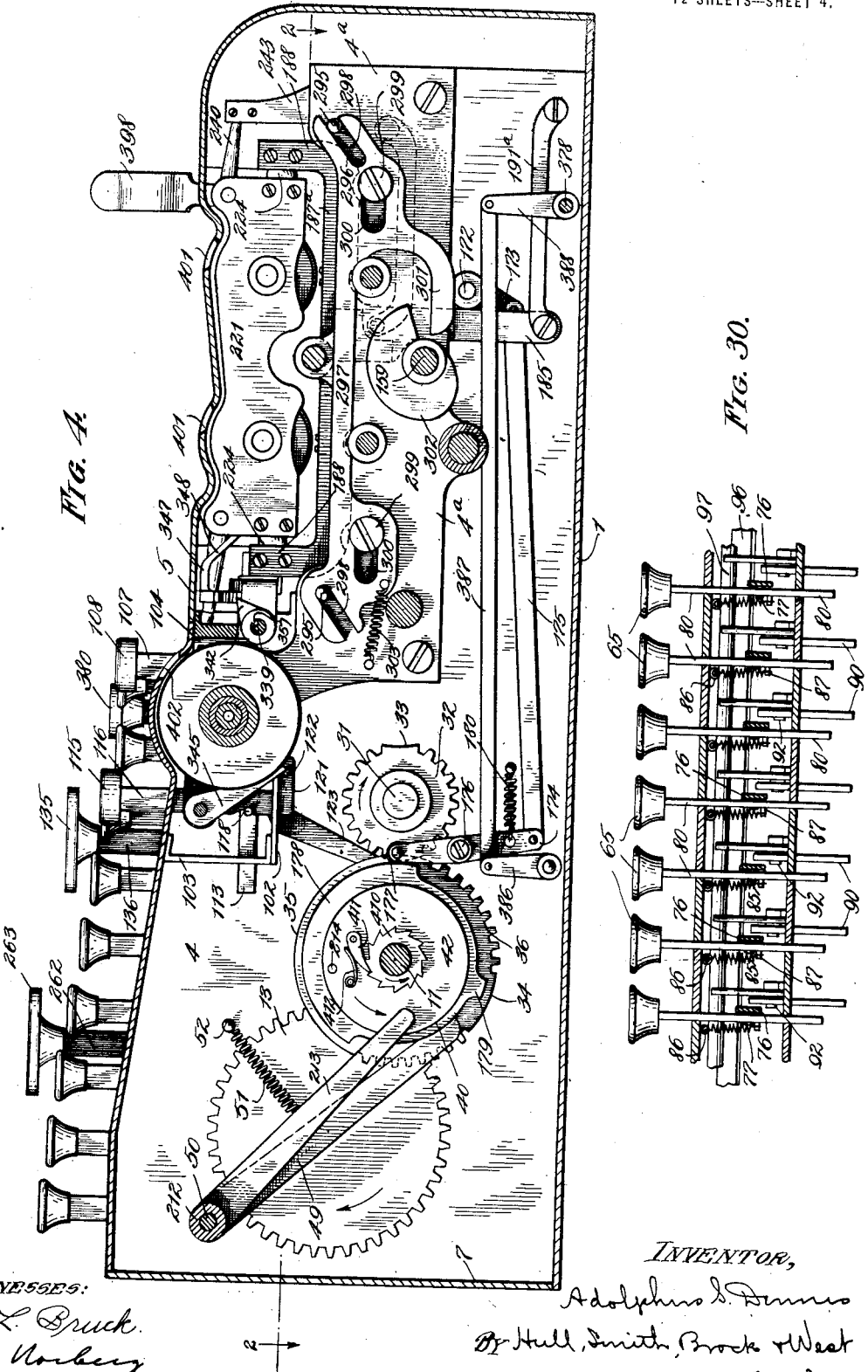

A. S. DENNIS.
CALCULATING MACHINE.
APPLICATION FILED SEPT. 18, 1915.
1,356,605.
Patented Oct. 26, 1920.
12 SHEETS—SHEET 5.
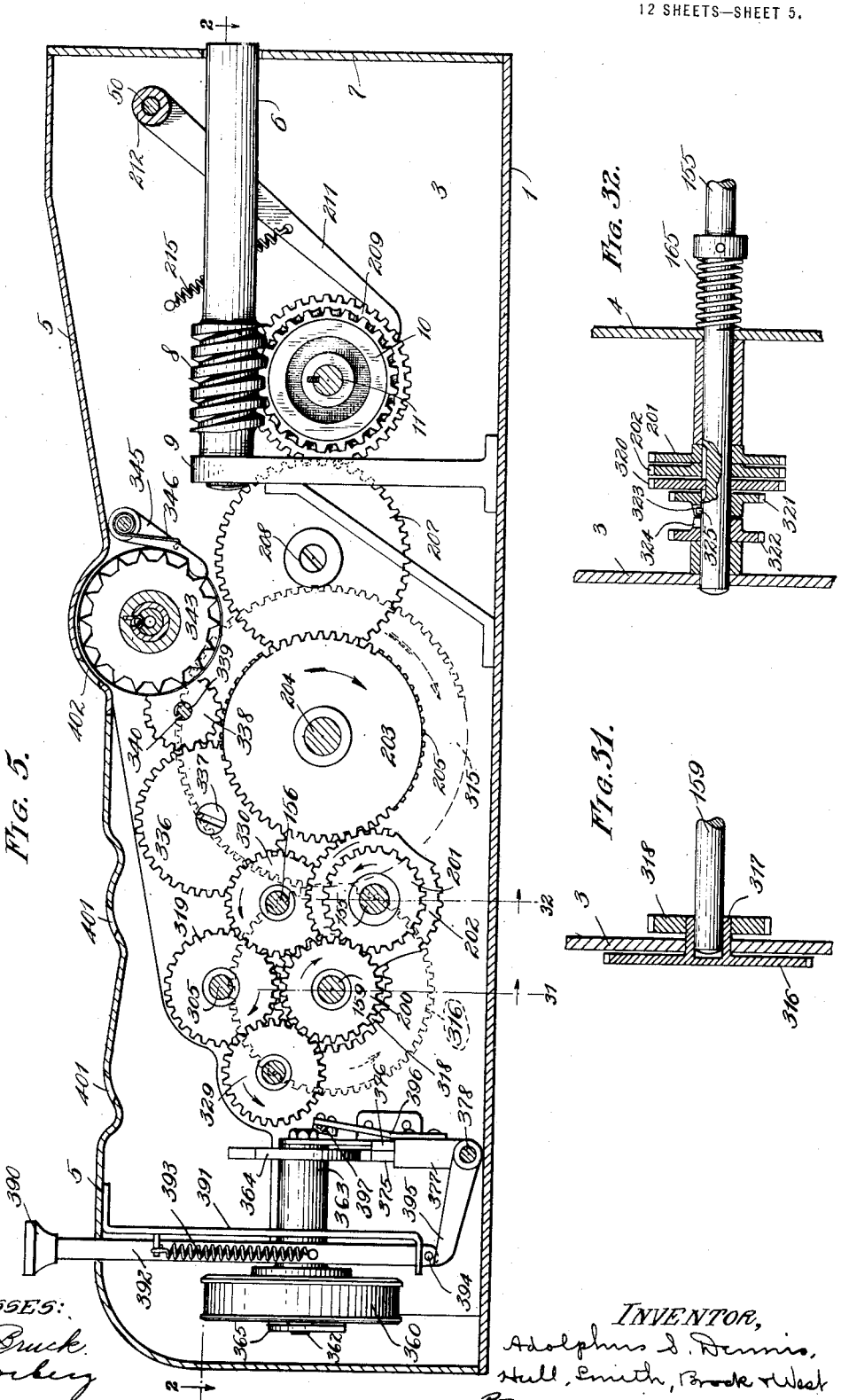

A. S. DENNIS.
CALCULATING MACHINE.
APPLICATION FILED SEPT. 18, 1915.

1,356,605.

Patented Oct. 26, 1920.
12 SHEETS—SHEET 6.

WITNESSES:
R. L. Bruck.
H. Norberg

INVENTOR,
Adolphus S. Dennis
Hull, Smith, Brock & West
BY
ATT'YS.

A. S. DENNIS.
CALCULATING MACHINE.
APPLICATION FILED SEPT. 18, 1915.

1,356,605.

Patented Oct. 26, 1920.
12 SHEETS—SHEET 7.

WITNESSES:

INVENTOR
Adolphus S. Dennis,
Hull, Smith, Brock & West
BY
ATT'YS

A. S. DENNIS.
CALCULATING MACHINE.
APPLICATION FILED SEPT. 18, 1915.

1,356,605.

Patented Oct. 26, 1920.
12 SHEETS—SHEET 8.

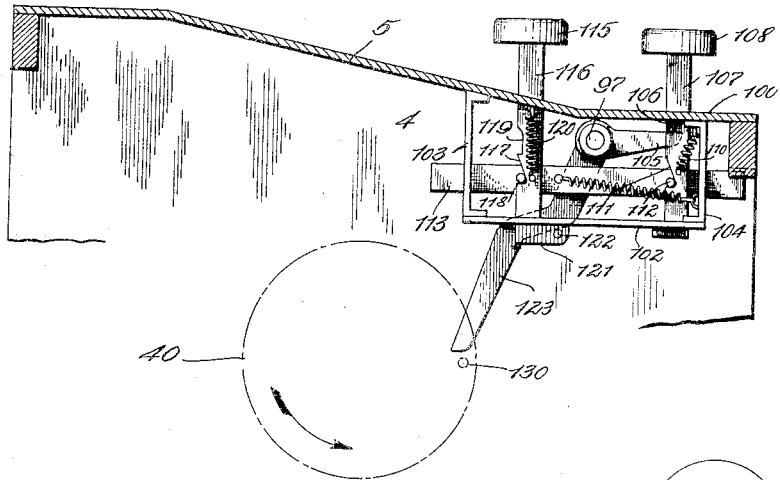
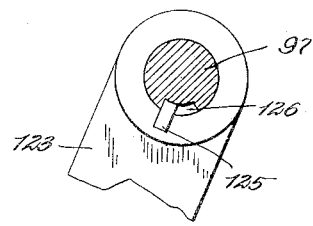
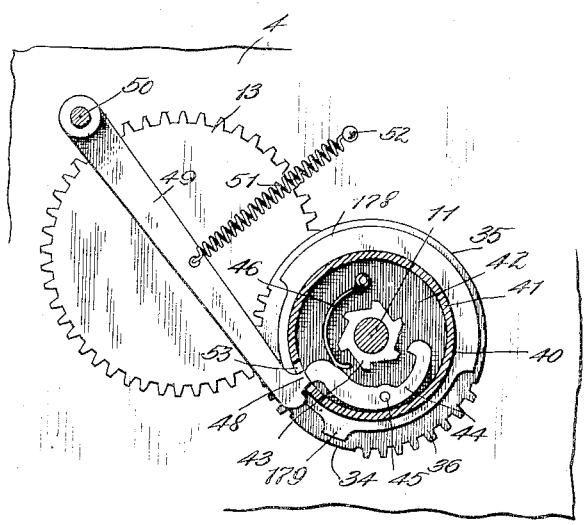
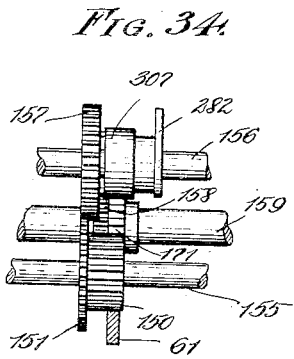

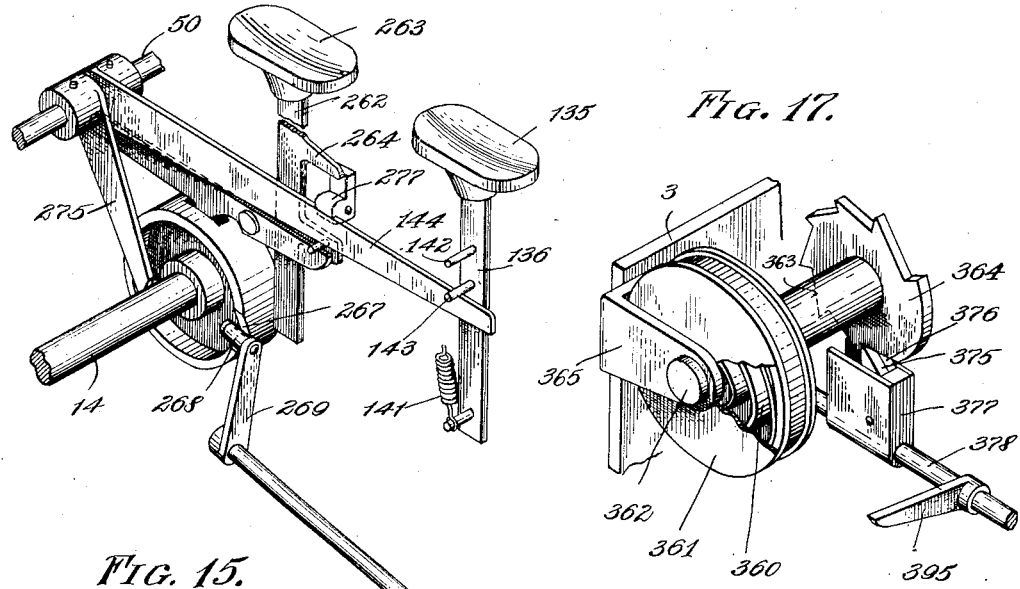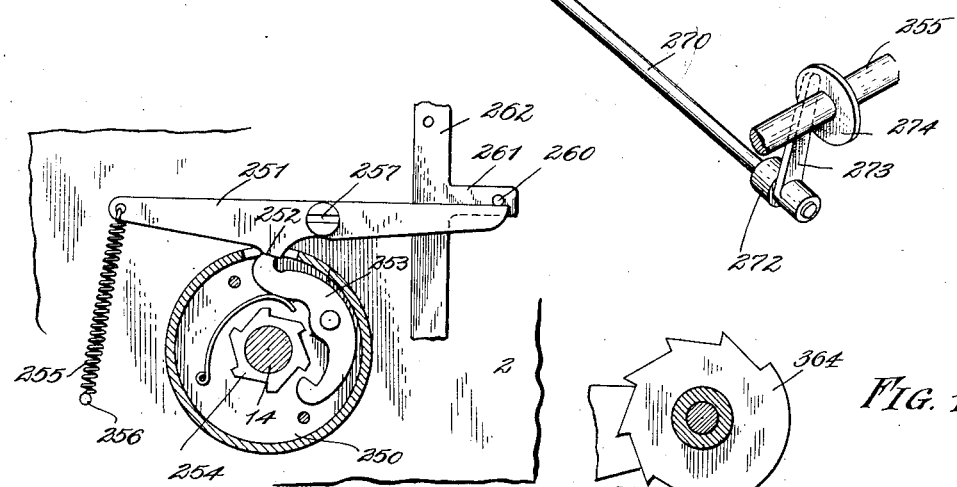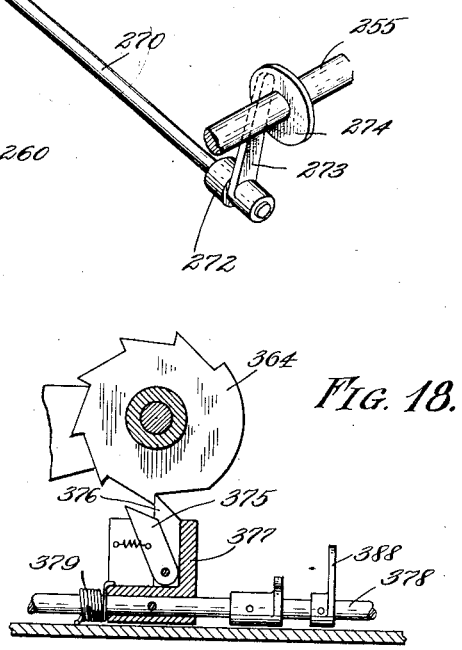

A. S. DENNIS.
CALCULATING MACHINE.
APPLICATION FILED SEPT. 18, 1915.
1,356,605.
Patented Oct. 26, 1920.
12 SHEETS—SHEET 11.
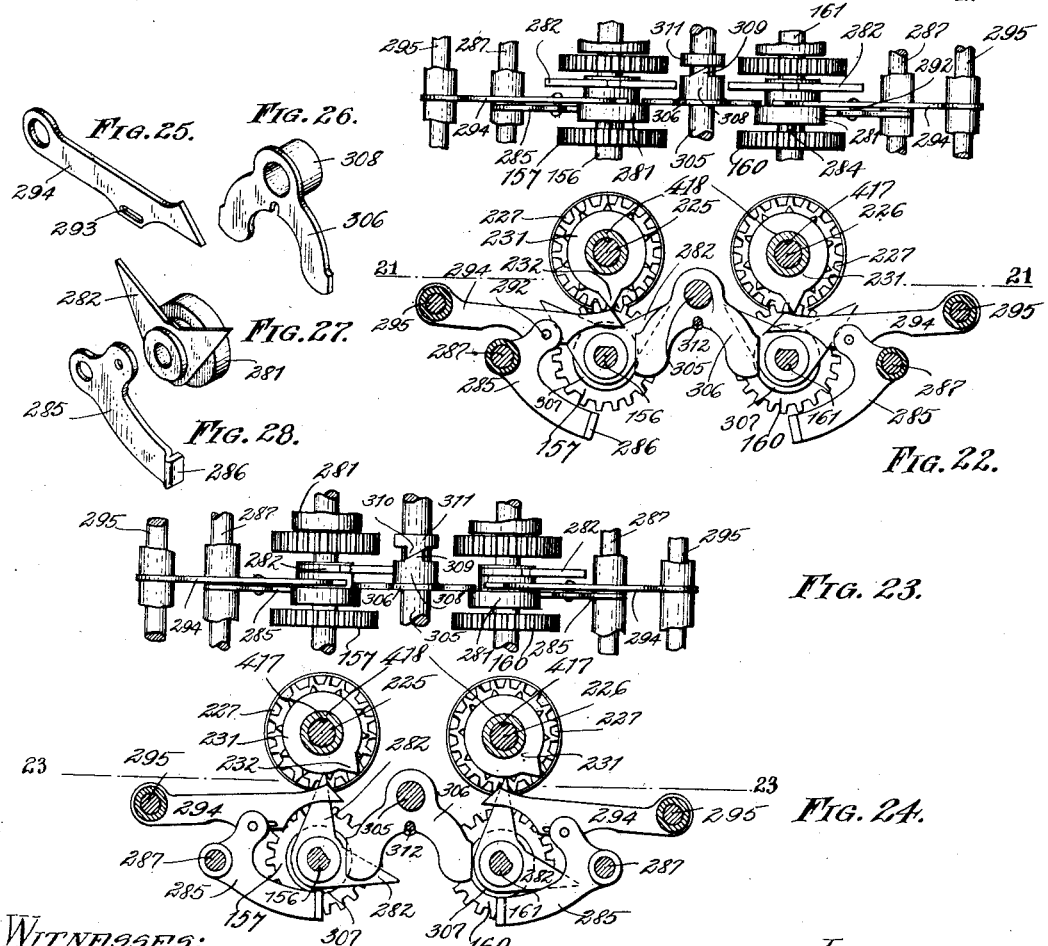

A. S. DENNIS.
CALCULATING MACHINE.
APPLICATION FILED SEPT. 18, 1915.

1,356,605.

Patented Oct. 26, 1920.
12 SHEETS—SHEET 12.

WITNESSES:
R. L. Bruck
H. Norberg

INVENTOR,
Adolphus S. Dennis
BY Hull, Smith, Bruck & West
ATT'YS.

UNITED STATES PATENT OFFICE.

ADOLPHUS S. DENNIS, OF CLEVELAND, OHIO, ASSIGNOR TO MARCHANT CALCULATING MACHINE COMPANY, A CORPORATION OF CALIFORNIA.

CALCULATING-MACHINE.

1,356,605.	Specification of Letters Patent.	Patented Oct. 26, 1920.

Application filed September 18, 1915. Serial No. 51,302.

*To all whom it may concern:*

Be it known that I, ADOLPHUS S. DENNIS, a citizen of the United States, residing at Cleveland, in the county of Cuyahoga and State of Ohio, have invented a certain new and useful Improvement in Calculating-Machines, of which the following is a full, clear, and exact description, reference being had to the accompanying drawings.

This invention relates to calculating machines, especially to machines of this character that are power driven; and the invention has for its primary object the provision of a machine of the aforesaid character that is simple and convenient of use; and that is accurate, prompt and practically automatic in performing the various numerical computations of addition, subtraction, multiplication and division.

Inasmuch as subtraction is the reversal of addition, so to speak, and division bears a like relation to multiplication, it is my plan to employ means whereby the adding mechanism is reversed automatically upon the depression of a " subtracting " key (or its equivalent,) and likewise when certain means is actuated, the mechanism used in multiplication is automatically reversed to convert the computation into division.

It is a further object of my invention to provide mechanism whereby, upon the depression of numeral keys that represent the elements of the computation, and the subsequent actuation of other keys that represent the nature of the computations, the machine will automatically produce the desired result.

In cases of addition it is sometimes desirable to compile a series of sub-totals, and also to secure a grand-total of all sub-totals. For this purpose I provide two sets of indicating wheels, such sets being commonly known to the art as " adding " or " computing-heads." Upon one of these heads is allowed to accumulate the grand-total of all of the given items, while upon the other is permitted to build up only the sums of separate groups of the former items, constituting sub-totals, the latter head being " set to zero," or, in other words, returned to normal condition after each sub-total has been acquired therefrom. A further object emanating from this is the provision of means for setting the sub-total head to zero independently of the grand-total head; and additional means whereby both heads may be set to zero simultaneously. A counter is incorporated in the machine, the indicating wheels of which are actuated indirectly from the same mechanism as operates the indicating wheels of the computing heads. It may be explained that the computing heads of the machine are supported upon a carriage that is provided with an escapement mechanism for controlling the movement of the carriage, so that the same may be caused to travel " step by step " under the influence of a motive spring, from one extreme limit of its movement to the other. Suitable connections are provided between the carriage and counter for selecting those indicating wheels of the counter which correspond, in order to those of the computing heads from whose mechanisms they are operated, as the carriage travels under the influence of the aforesaid spring. As will be pointed out farther along in this description, the counter is used in multiplication and division, the multiplier or divisor appearing upon the counter as the operation progresses. Means is employed for conveniently setting the indicating wheels of the counter to zero position.

Since multiplication consists in adding a given number to itself any desired number of times, it follows that, if the given number is placed in the machine by the depression of appropriate keys, and the machine subsequently operated the number of times represented by the multiplier—or, in other words, the number of times the given number is to be added to itself—the result will constitute the product. Therefore, it is a further object of my invention to provide means whereby the machine may be caused to automatically repeat its operations any desired number of times. Also, inasmuch as division is the reversal of multiplication, this repeating means is employed when performing division.

The foregoing objects, and others which will become apparent as this description proceeds, are attained in a machine constructed in accordance with the accompanying drawings which form a part hereof. After a brief description of the several figures of the drawings and a detail description of the construction of the machine, wherein similar reference characters are used to designate corresponding parts throughout the several views, I will follow with a brief description of the operation of the machine as it is used in performing the several numerical computations above enumerated.

Figure 2:
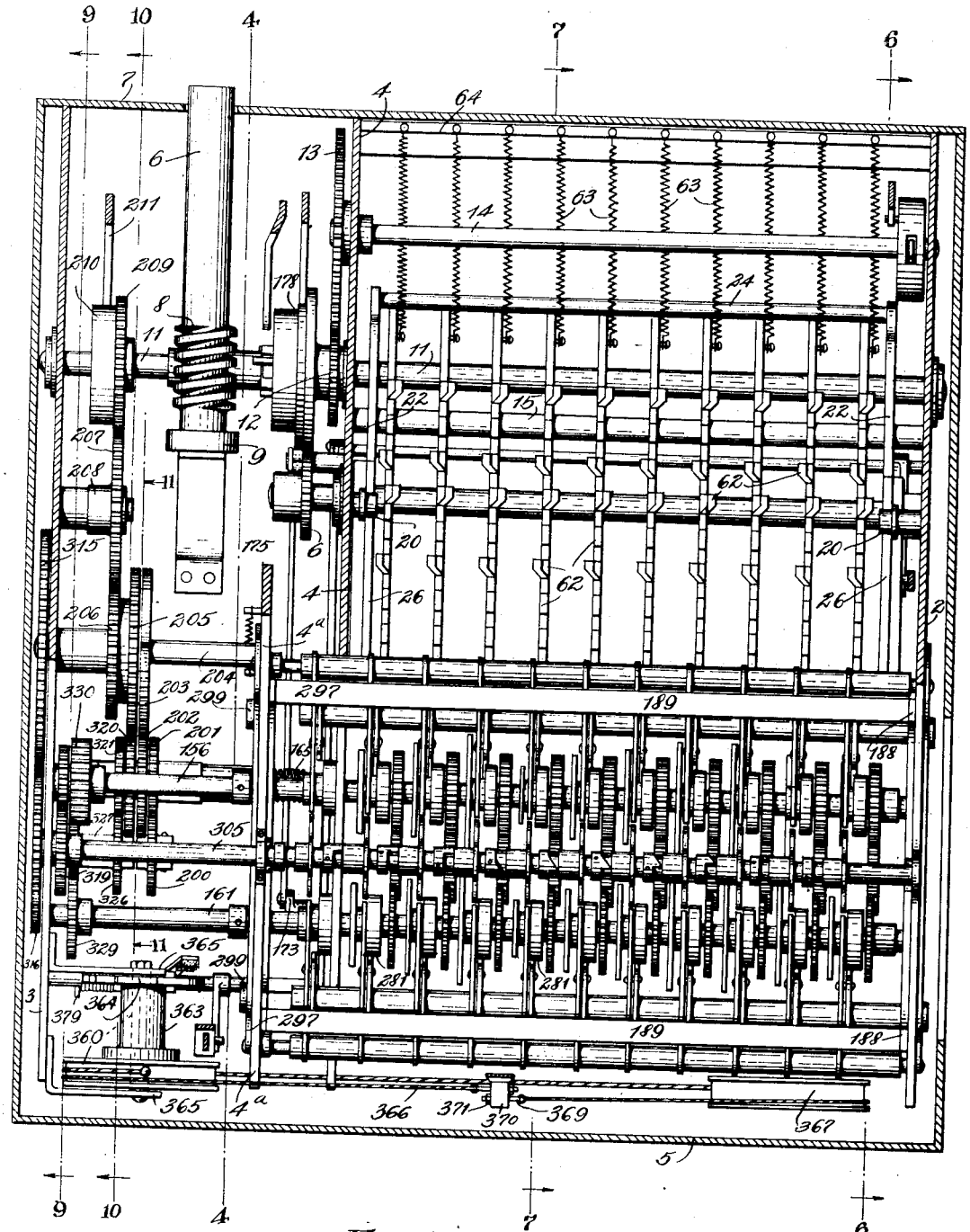
Figure 3:
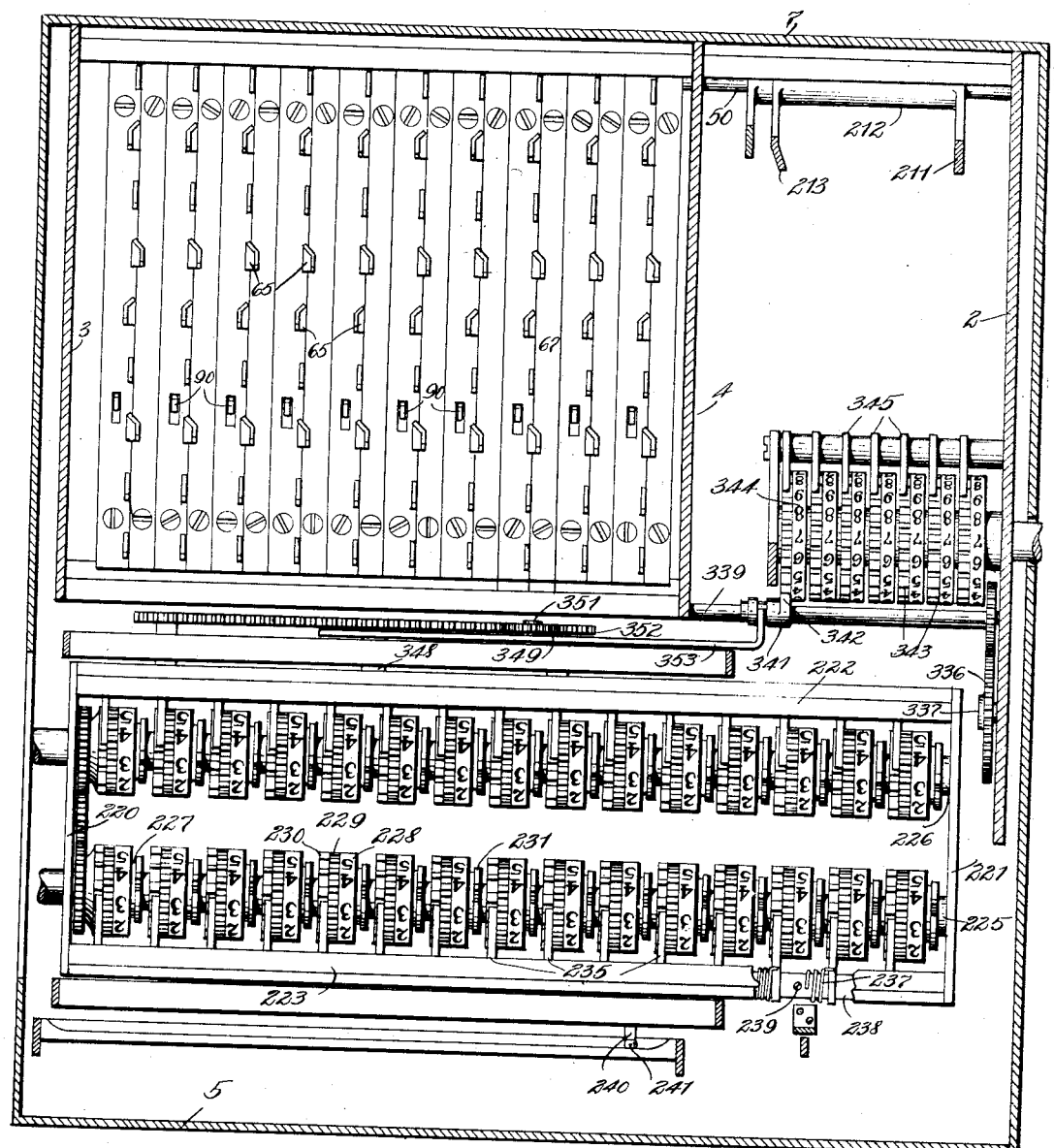
Figure 29:
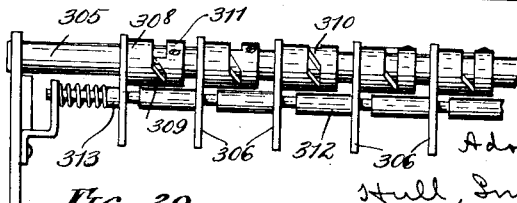
Figure 6:
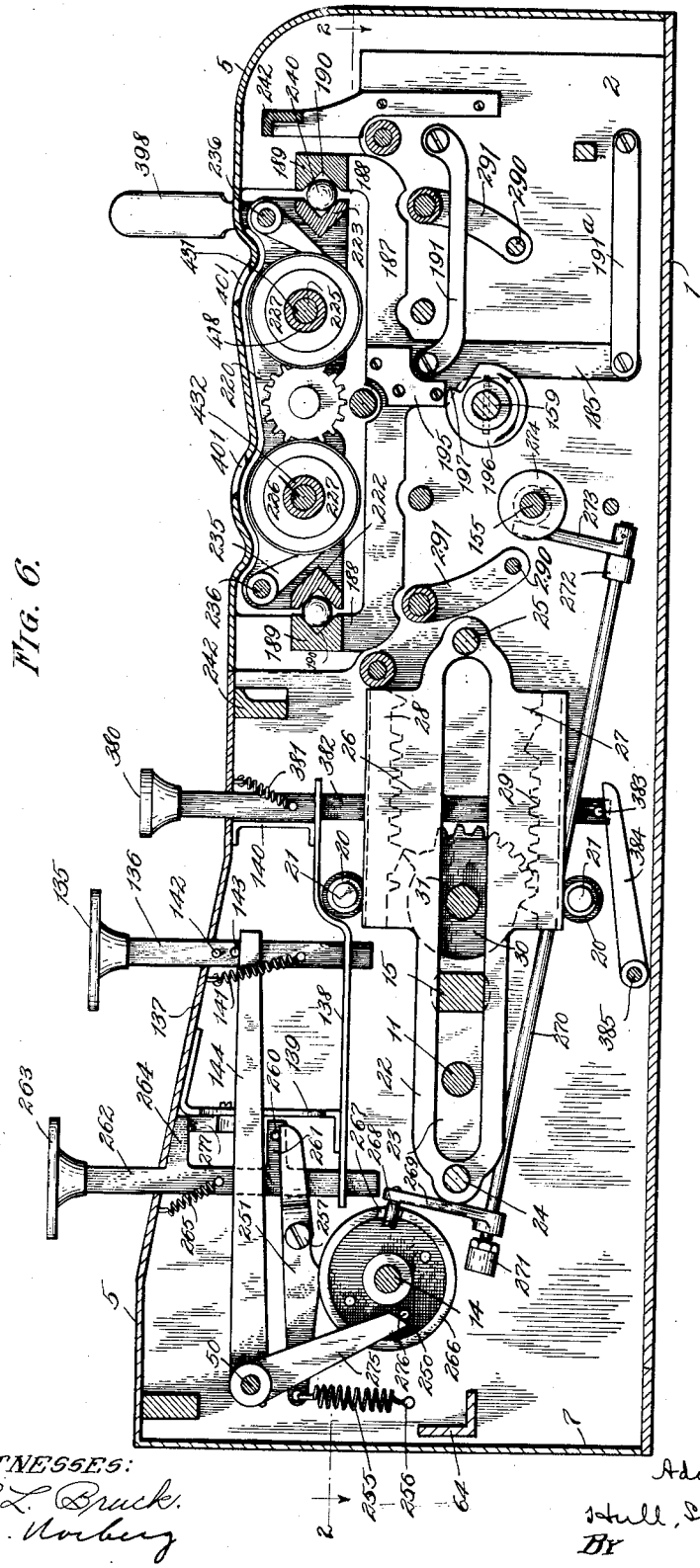
Figure 33:
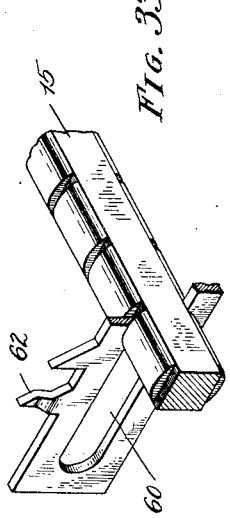
Figures 7, 8:
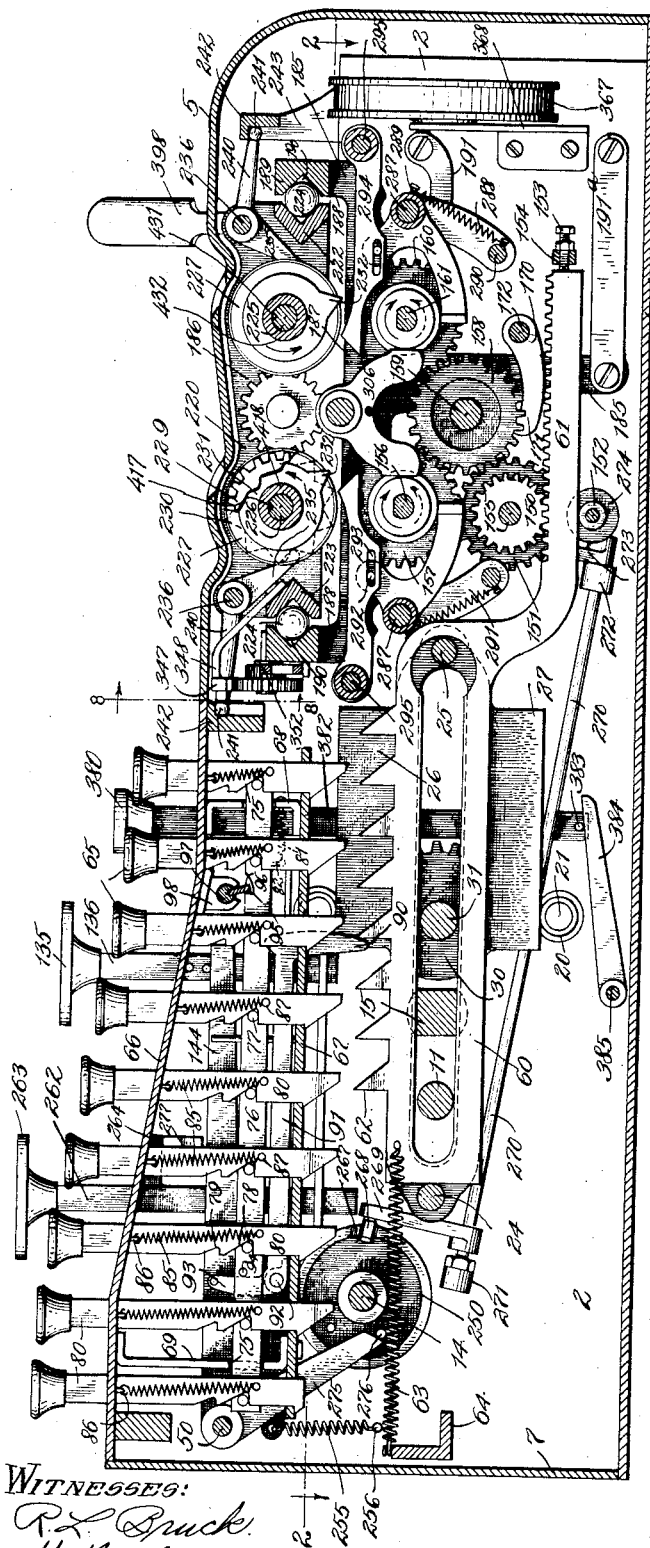
Figure 9:
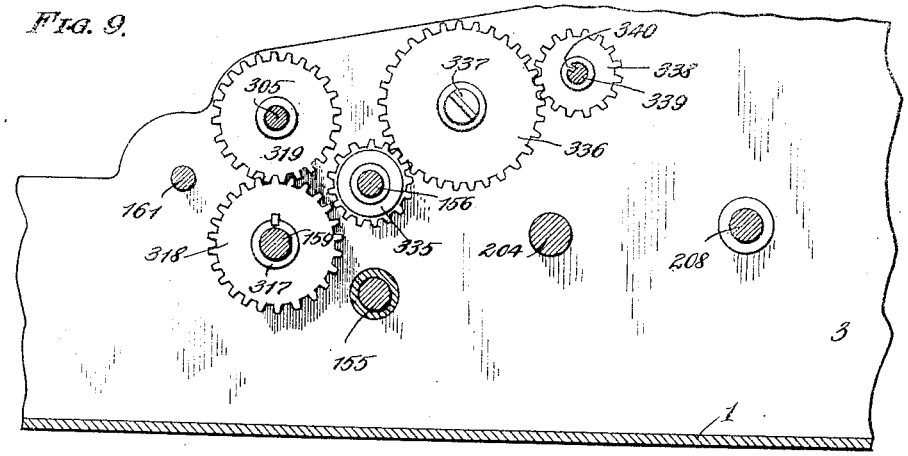
Figure 10:
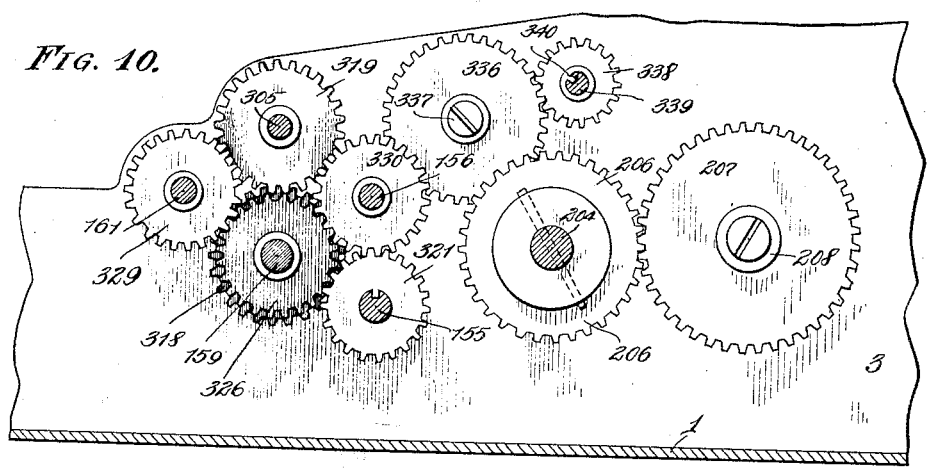
Figure 11:
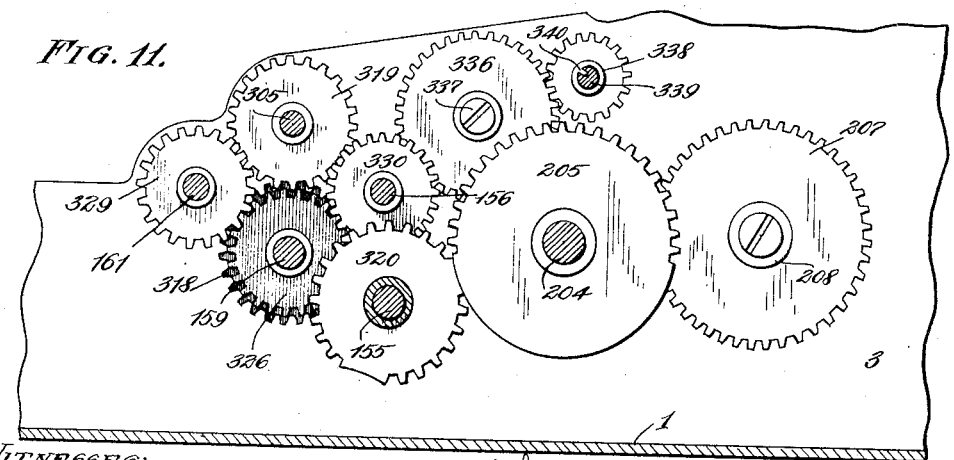
Figure 35:
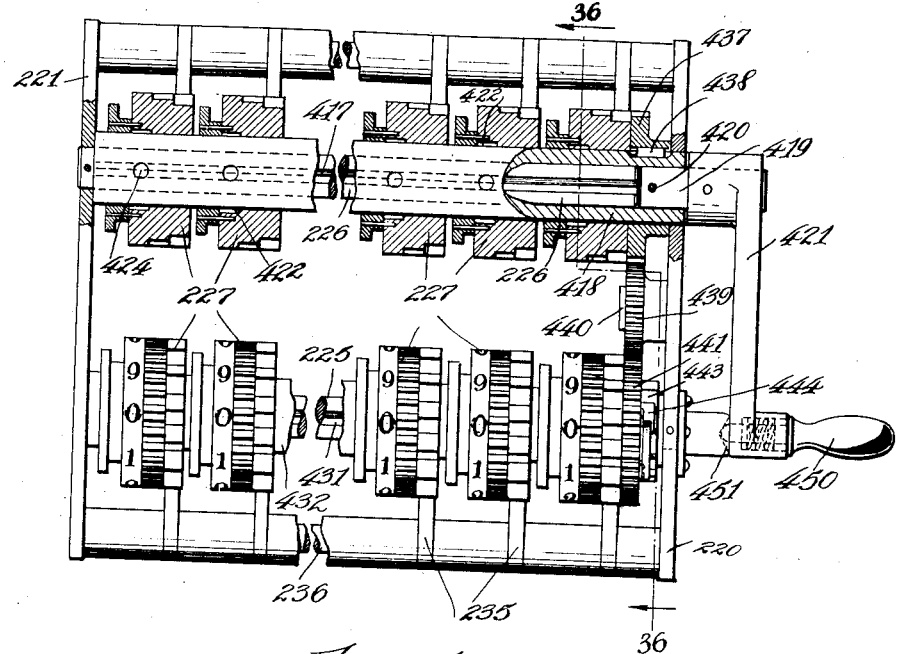

Figure 1 is a perspective of the machine; Fig. 2 is a sectional plan taken on the lines 2—2 of Figs. 4, 5, 6 and 7; Fig. 3 is a horizontal section on the lines 2—2 of the aforesaid Figs. 4, 5, 6 and 7, and looking upward; Fig. 4 is a vertical section from front to rear through the left hand end of the machine and looking toward the right, such section being taken on the line 4—4 of Fig. 2; Fig. 5 is a section taken on the same line as Fig. 4, but looking toward the left; Fig. 6 is a section through the right hand end of the machine, on the line 6—6 of Fig. 2, and looking in the direction of the arrows; Fig. 7 is a similar section on the line 7—7 of Fig. 2; Fig. 8 is a sectional detail taken on the line 8—8 of Fig. 7; Figs. 9, 10 and 11 are fragmentary sections through the left hand end of the machine, the respective sections being taken on the correspondingly numbered lines of Fig. 2; Fig. 12 is a sectional detail of the main clutch; Fig. 13 is a detail of the "repeat" and "clear" keys; Fig. 14 is an enlarged section through the key releasing shaft and shows the lost-motion connection between it and the lever whereby said shaft is mechanically oscillated; Fig. 15 is a perspective view of the "adding" and "subtracting" keys and parts of the mechanisms operated thereby; Fig. 16 is a sectional detail of the clutch that is controlled by the subtracting key, and shown in the preceding figure; Figs. 17 and 18 are a perspective and a sectional detail of the escapement mechanism for the carriage; Figs. 19 to 24 are details of the "ten-carrying" mechanism, showing the same in various positions it assumes during one operation; Figs. 25 to 28 are perspectives of certain parts of the "ten-carrying" mechanism; Fig. 29 is a detail of the spring actuated rod whereby the shifting forks of the "ten-carrying" mechanisms are moved to normal position; Fig. 30 is a vertical section through several successive numeral key banks; Figs. 31 and 32 are sectional details of gearing adjacent the left hand end plate of the machine; Fig. 33 is a fragmentary view of one of the rack bars and the adjacent part of the beam whereon it is guided; Fig. 34 is a detail of certain of the gears through which the oscillation of one of the rock shafts is transmitted to the indicating wheels. Fig. 35 is a fragmentary sectional plan of the carriage; and Fig. 36, a transverse section through the carriage on the line 36—36 of Fig. 35.

Throughout the description, except where otherwise specified, it will be assumed that the machine is viewed from the front. The base 1 of the machine comprises a plate, from the lateral edges of which rise the right and left hand side plates 2 and 3, respectively, and an intermediate plate 4 which is parallel to the aforesaid plates and is located some distance to the left of the center of the machine. A casing that is substantially square in plan and shown generally at 5, incloses the various operating mechanisms and its lower edges coöperate with the edges of the base 1.

A main driving shaft 6 projects through the rear wall 7 of the casing into the space between the left hand side plates 3 and the intermediate plate 4, and this shaft is provided with a worm 8. Beyond the worm, the inner end of the shaft is journaled in a suitable bracket 9. The worm 8 meshes with a worm wheel 10 (see Fig. 5) that is keyed or otherwise secured to the shaft 11 which has its ends journaled in the side plates of the machine and which passes through the intermediate plate 4. Adjacent the plate 4, the shaft 11 is provided with a pinion 12 which meshes with a gear 13 on the shaft 14 that is journaled in the intermediate plate 4 and the right hand side plate 2. The shaft 6 may be driven by any convenient means, such as an electric motor. During the time that the machine is in use, the shaft 6 is kept running constantly, thereby continually driving the shafts 11 and 14. While I have specifically described a worm drive, it is obvious that any satisfactory equivalent may be substituted therefor, for the accomplishment of continually driving the shaft 11.

Supported rigidly by and between the right hand end plate and the intermediate plate 4 is a beam 15 having flattened front and rear sides and curved upper and lower sides, as shown clearly in Figs. 6 and 7 and 33. The latter sides of the beam are provided with a series of transverse grooves. Guided upon each end of the beam 15, and also between rollers 20 which are carried upon studs 21, that project inwardly from the respective right hand end plate 2 and the intermediate plate 4, is a rack restoring frame which comprises two end plates 22 which are slotted at 23, the inner edges of which slots are guided in grooves in the upper and lower sides of the beam 15, and which have their corresponding ends connected by the tie-rods 24 and 25. The forward ends of the side plates 22 have upwardly and downwardly extending enlargements or wings 26 and 27, and each of these wings carries a rack on its surface adjacent the respective end or intermediate plate of the machine, the upper and lower racks being shown respectively at 28 and 29 in Fig. 6. It will be noted from an inspection of said figure that the racks are of peculiar formation and that each is arranged to coöperate with a mutilated gear 30 that is secured to the end of a shaft 31 which is journaled in the right hand end plate 3 and the intermediate plate 4, through the latter of which said shaft projects and beyond which it is provided with the gear 32 which has two smooth spots 33 for coöperation with the smooth portions 34 and 35 of a mutilated gear 36 which is carried by the casing of the main clutch, shown in detail in Fig. 12.

The main clutch just referred to is indicated generally at 40, and the casing thereof comprises the cylindrical wall 41, the ends of which are closed by the circular walls 42. Between the end or circular walls of the casing, the shaft 11 has secured to it a ratchet 43 with the teeth whereof is adapted to coöperate the nose of a pawl 44 which is pivoted at 45 to one of the circular walls of the clutch casing. A spring 46, which is carried by the same wall to which the pawl 44 is pivoted, bears against the tail of the pawl and tends to rock the pawl in a direction to cause its nose to engage the teeth of the ratchet 43. The projections 48 of an arm 49, that is pinned, or otherwise secured, to the shaft 50, is arranged to coöperate with the tail of the pawl 44 and, under the influence of the spring 51, which has one of its ends connected to the aforesaid arm 49 and its other end anchored to the intermediate plate 4, at 52, to swing said pawl upon its pivot and remove its nose from the teeth of the ratchet 43, the projecton 48 engaging the tail of the pawl through the slot 53 in the cylindrical wall of the clutch casing.

It has been previously stated that the upper and lower sides of the beam 15 are each provided with a series of transverse grooves. The respective grooves of the upper series are located directly above those of the lower, so that each upper groove and the corresponding lower one, may well be considered a pair of grooves. Now, within each pair of grooves there is guided a rack-bar, shown at 60, from the forward end of which projects downward and then forward a rack 61. Rising from the upper edge of each of the rack-bars is a series of staggered lugs 62 which, as will be described presently, coöperate with the lower ends of the numeral key stems. The rear end of each of the rack-bars 60 is connected, by means of a spring 63, to a stationary angle bar 64 which extends from the rear edge of the intermediate plate 4 to the corresponding edge of the right hand side plate 2.

Located above and in the same vertical plane as each of the rack-bars 60, is a bank of numeral keys 65 the stems whereof are guided in notches that are formed in the side edges of the upper and lower guide plates 66 and 67, respectively. The lower guide plate 67 is suspended from the upper one 66 by means of the front and rear braces 68 and 69. Guided within the notches 75, that are formed in the side edges of the braces 68 and 69, are the stop bars 76, one being associated with each bank of keys. Stop pins 77, which project laterally from the bars 76, are arranged to coöperate with the notches 78 and 79, that are formed in the rear edges of the key stems 80. When the keys are in elevated or normal position, the stop pins 77 are contained within the lower notches 78. The stop bar 76 is moved forwardly, and normally retained in such position, by means of a spring 81, which is connected at 82, to the stop bar 76, said spring having its opposite end connected to the forward brace 68. Each of the numeral keys is provided with a spring 85 which has its upper end secured, at 86, to the upper guide plate 66, and its lower end connected at 87 to the stem of the key.

It has already been described how one rotation of the main clutch 40 will effect a rotation of the shaft 31, and consequently, through the mutilated gears 30, a reciprocation of the rack-restoring frame. Unless some means were provided to prevent it, at each reciprocation of the restoring frame, all of the rack-bars 60, under the influence of their springs 63, would move toward the rear of the machine and would then be moved forward again by the engagement of the rear tie-rod 24 with the rear ends of said rack-bars. Such an operation, as will become clear later on, would cause the rotation of several of the adding wheels through nine digits, and only those which were controlled by the numeral keys would be arrested in their movement. Therefore, to prevent the backward movement of the rack-bars when no keys have been depressed in their respective banks, I provide a drop 90 which normally rests in the path of one of the lugs of each rack-bar 60 and prevent any rearward movement thereof. The drop 90 consists of a head which is carried upon the end of the horizontal arm of a bell crank 91, the same being pivoted at 92 to a bracket which rises from the guide plates 67, and which has a vertical branch 93, the forward edge of which is arranged to be engaged by a pin 94 which extends from the side of the stop bar 76. It will be noted that the side of each of the key stem notches 78 and 79 which is presented to the forward side of the respective stop pin 77, is inclined so as to form a cam that will move the stop bar 76 rearwardly upon the depression of any one of the numeral keys of its respective bank. Therefore, it will also be seen, that, when any one of the keys of a bank is depressed, the bar 76 will be moved rearwardly, and because of the engagement of the pin 94 with the vertical arm 93 of the aforesaid bell crank, the drop 90 will be elevated out of the path of the lug of its rack bar 60, and will be held above the top of said lug because of the fact that the upper notches 79 of the key stems are of some lesser depth than the lower notches 78. Therefore, the stop bar 76 will be retained slightly to the rear of its normal position and consequently hold the drop 90 at the aforesaid elevation.

Attention is now directed to the notches 95 that are formed in the upper edge of the stop bars 76 and with the rear, abrupt walls of which notches engage the fin 96 of a rock shaft 97 that is journaled at its right hand end, in a bracket 98, and at its opposite end, in the intermediate plate 4. It will be seen that, if any of the numeral keys are depressed and are being held in depressed position by the presence of certain of the stop pins 77 within their upper notches 79, said pins may be released by oscillating the shaft 97 to cause its fin 96 to slide the stop bars rearwardly and withdraw the stop pins from the upper notches of the depressed keys.

The shaft 97 may be manually rocked by the depression of the "clear" key that is located just to the left of the intermediate plate 4 and is guided in notches that are formed in the upper and lower guide plates 100 and 102 (see Fig. 13) said plates being connected by the braces 103, and 104. Pinned or otherwise secured to the left hand end of the shaft 97 is an arm 105, the free end of which is arranged to be depressed by a pin 106 that projects from the side of the stem 107 of the "clear" key 108. When the key is depressed, therefore, the shaft 97 will be rocked in a direction to cause its pin 96 to move the stop bars 76 rearwardly whereupon all of the depressed keys in the various banks will be simultaneously released, and elevated by their respective springs 85, to normal position. The key 108 is retracted by a spring 110. The rear edge of the stem 107 of this key is provided with a notch 111, similar to the notches 78 of the numeral keys, and a pin 112 which projects from the side of the stop bar 113, is arranged to occupy this notch and be moved by the inclined edge of said notch, when the key is depressed.

Guided within the notches in the guide plates 100 and 102, is the stem of a second key 115, known as the "repeat" key, and said stem 116 of this key has a notch 117, similar to the notch 111 of the key 108, with which coöperates a stop pin 118, on the stop bar 113. A second notch 119, that is formed in the stem 116 above the notch 117, receives the pin 118 for the purpose of retaining the repeat key in depressed position. The key is elevated by a spring 120.

Below the guide plate 102, the stem 116 is provided with a foot 121 from the side of which projects a pin 122 beneath the lower edge of a lever 123 that is loosely mounted upon the shaft 97 between the arm 105 and the adjacent surface of the intermediate plate 4. While I have stated that the arm 123 is loosely mounted upon the shaft 97, said arm is allowed only a limited amount of angular movement thereon. In other words, a lost-motion connection is made between the arm 123 and the shaft 97, which is illustrated in Fig. 14. It will be seen from an inspection of this figure that a key 125 projects radially into a segmental recess 126 that is formed in the side of the shaft 97. The angular extent of the segmental recess 126 is considerably greater than the thickness of the key 125, thereby providing considerable free movement of the arm 123 upon the shaft 97. When the arm 123 is retained in the position shown in Figs. 13 and 14, by the pin 122 of the key 115, the key 125 of said arm will occupy the rear end of the segmental recess 126. Therefore, any rearward movement of the arm 123 from this position, will cause the shaft 97 to be rocked in a direction to release the keys. Such an oscillation of the shaft is performed upon every rotation of the main clutch 40, by means of a pin 130 which projects from the side of the clutch casing into the path of the lower end of the arm 123 and whereby said arm will be elevated, unless the "repeat" key has been depressed to allow said arm, by gravity, to fall out of the path of the pin 130 of the clutch (the aforesaid lost-motion connection with the shaft 97, allowing it to swing freely thereon in a forward direction).

What may be considered the "adding" key is located at the right hand end of the casing and is indicated at 135; and the stem 136 of this key is guided vertically within the guide plates 137 and 138, the latter being suspended from the former by means of the braces 139 and 140. This key is shown especially well in Figs. 6 and 15, where it will be seen that a spring 141 tends to retain said key in elevated position. Projecting laterally from the side of the key stem are two pins 142 and 143, the former being arranged to engage the underneath surface of the plate 137 and thereby prevent undue upward movement of the key stem, while the latter is arranged to contact with the forward end of an arm 144 which is pinned, or otherwise secured, to the shaft 50 that is journaled in the upper rear corners of the end plates 2 and 3, and which passes freely through the intermediate plate 4. This is the shaft that was previously referred to as having the arm 49 secured to it, which arm, it will be remembered, is associated with the main clutch. It will be seen, therefore, that the depression of the key 135 simply rocks the shaft 50 to cause the projection 48 of the arm 49 to be withdrawn from the tail of the pawl 40 and from the slot 33 in the main clutch casing, whereupon the clutch is permitted to be rotated by the shaft 11.

It will be noted from an inspection of Fig. 1 that the numeral keys of each bank progress in value from one to nine successively from the front toward the rear of the machine. When any one of the keys of a bank is depressed and the machine subsequently operated, the rack bar 60, which corresponds to the bank wherein one of the keys has been depressed, will be moved rearward by its spring 63 until the lug 62 that is designed to coöperate with the lower end of the stem of the particular key depressed, comes into contact with and is arrested by said key stem. It may be explained at this time, that the staggered arrangement of the lower ends of the key stems and the corresponding staggered arrangement of the lugs 62 of the rack bars, as clearly shown in Figs. 2 and 3, is for the purpose of allowing the proper lug to coöperate with the proper key and to prevent each lug from engaging the key immediately to the rear of it unless it is designed so to do. For instance, the first and second keys of a bank are arranged to coöperate with the first and second lug from the forward end of the respective rack-bar. In order to keep the third lug of the rack bar from engaging the second key when the latter is depressed, the lug is turned slightly to one side. Likewise the lower end of the third key stem is turned to one side or into the path of the third lug. The fourth lug of the rack bar is in alinement with the first and second lug, but the third key stem, being offset at its lower end, will not interfere with the passage of the fourth lug, and the fourth key stem being straight, will arrest the movement of the rack bar by engagement with the fourth lug thereof. This arrangement is carried on throughout the remainder of the lugs and key stems. It is obvious that no lug is required for engagement with the last key stem, or the stem of the nine key of each bank, for the reason that the tie-rod 24 of the rack restoring frame will form a stop that will limit the rearward movement of the rack bar. Thus it will be seen that each bar will be moved a distance corresponding to the numeral key depressed.

Meshing with the rack 61 of each of the rack bars is a pinion 150 which has secured to it a gear 151. The rack 61 is held in constant mesh with the pinion 150 by the roller 152 upon which bears the lower edge of the rack. It may be mentioned at this time that the forward position of each of the rack bars may be accurately adjusted by a set screw 153, which is threaded through a stationary bar 154. The end of the rack is arranged to abut the end of the screw 153.

As will appear clearly from Fig. 34, the pinion 150 is substantially twice the width of the gear 151. The shaft 155, whereon the pinions 150 and the gears 151 are loosely mounted, is shiftable, and is journaled in the end frames of the machine. Collars 154 seprate the respective units comprising the pinions 150 and gears 151 and prevent longitudinal movements of them upon the shaft 155. Loosely mounted upon a shaft 156, which is also journaled in the end plates of the machine, are the gears 157 which are shown as considerably wider than the gears 151. The gears 157 mesh with gears 158 of a corresponding width, and which are loosely mounted upon the shaft 159. The respective gears 157 are not in the same vertical plane as the corresponding gears 158, but they do overlap somewhat so that the edges of the teeth of the gear 157 mesh with the opposed edges of the teeth of the gear 158. The gears 158 mesh with gears 160 that are loosely mounted upon the shaft 161, that is supported, like the former shaft, by the end plates of the machine.

I have already stated that the shaft 155 is shiftable. The mechanism for mechanically shifting the shaft will be presently described, and the spring 165, which tends to maintain the shaft 155 in normal position, or toward the left, may be observed in Figs. 2 and 32. When the shaft 155 is in left hand position, the gears 151 mesh with the left hand side of the gears 157, and are out of mesh with the gears 158. Upon the shifting of the shaft 155, however, the gears 151 are moved out of mesh with the gears 157 and into mesh with the gears 158. Therefore, when the shaft 155 is toward the right, for example, and the rack 61 is moving forward, the pinion 150 and the gear 151 will be rotated to the left or in the direction indicated by the arrows in Fig. 7. This will result in the gear 157 being rotated to the right, as indicated by the full line arrows and through the intermediate gear 158, will rotate the gear 160 in the same direction. Now, after the shifting of the shaft 155 toward the left, the same (or forward) movement of the rack 61, and the consequential left hand rotation of the pinion 150 and the gear 151, will cause the gears 157 and 160 to be rotated toward the left (or in the direction indicated by the dotted line arrows) through the gear 158 wherewith the gear 151 meshes. In other words, the gear 151 is shifted out of mesh with the gear 157 and into mesh with the gear 158, whereupon the gear 158 becomes the intermediate gear between the gears 151 and the gears 157 and 160.

To prevent inopportune movement of the gears 158, and the other gears which mesh therewith, I provide detent pawls 170. The nose of each of the pawls 170 is arranged to normally occupy a space between adjacent teeth of one of the star wheels 171 which is carried by each of the gears 158, The pawls 170 are secured to a shaft 172 which is journaled in the right hand end plate of the machine and in the intermediate plate 4, beyond which the left hand end of the shaft projects and where it is provided with an arm 173. The lower end of the arm 173 is connected to the corresponding end of a lever 174, by means of the link 175. The lever 174 is pivoted at 176 to the intermediate plate 4, and its upper end carries a roller 177 which rides upon a cam 178 that is carried by the main clutch casing (see Fig. 4).

Immediately after the main clutch starts to rotate, the roller 177 will drop from the elevated portion of the cam 178, and the shaft 172 will be permitted to rock and withdraw the pawls 170 from the star wheels 171. The gears 158 will remain unlocked until the brief high portion 179 of the cam passes under the roller 177, thereby operating the mechanism to temporarily lock the wheels 158 against rotation. It will be understood from what has been previously described that, during the time the wheels have been unlocked, the released rack bars 60 have been moved toward the rear of the machine. It is during the dwell between the rearward and forward movement of the released rack bars that the high portion 179 of the cam is effective. Just prior to the rack bars being moved forward by the restoring frame, which, it will be remembered, is actuated from the gear 36 that is carried by the main clutch, the rollers 177 will drop from the high portion 179 and cause the pawls 170 to be freed from the star wheels 171. The wheels remain free during the return movement of the rack bars, the elongated elevated portion of the cam 178 coming under the roller 177 immediately after the racks have reached their forward position, whereby the wheels 158 remain locked against rotation until the machine is again operated. I have shown the lever 174 as being swung by the spring 180 in a direction to cause the roller 177 to bear against the periphery of the cam 178.

Supported within the front of the machine, above the wheels 157 and 160, by a frame 185, is a carriage 186. The frame 185 comprises two substantially T-shaped end members 187, that portion of each member which corresponds to the cross of the T, having its ends turned up at 188. Connecting the corresponding portions 188 of the two end members 187, are the rails 189, which have their opposed faces provided with V-shaped grooves 190. To prevent confusion I have added the exponent "a" to the reference numerals which apply to the left hand end member of the frame 185, in other respects the same reference numerals being used to designate the corresponding parts of the right and left hand end members. Pivoted to that portion of each of the end members 187 and 187$^a$ which corresponds to the stem of the T, is a pair of parallel links 191 and 191$^a$, respectively, one being pivoted to the extreme lower end of each of said portions, while the other is pivoted to the upper end thereof. The links 191 which are pivoted to the right hand end member 187 of the frame 185, have their forward ends pivoted to the side plates 2 of the machine. The forward end of the lower link 191$^a$ has a pivotal connection with the forward lower corner of the intermediate plate 4; but the corresponding end of the upper link 191$^a$ is pivoted to a plate 4$^a$ which is supported by, and offset laterally from the plate 4, for the purpose of providing the room necessary to accommodate the frame 185. The plate 4$^a$ is clearly shown in Figs. 2 and 4. Since the plate 4$^a$ is, in all essential respects, a part of the plate 4, it will be referred to hereinafter as the intermediate plate 4$^a$.

At the junction of the stem and cross portion of each of the end members 187, there is secured to said member a bearing plate 195. These plates are identical at both ends of the frame, and for that reason it is deemed unnecessary to repeat what is shown, in Fig. 6, at the right hand end. Secured to the shaft 159, directly beneath each of the bearing plates 195, is a cam 196, upon the periphery of which bears the lower end of the corresponding bearing plate. Each of the cams 196 has an abrupt offset 197, which permits the bearing plates 195, and consequently the frame 185, to be dropped shortly after the cams 196 have started rotating in the direction indicated by the arrow. The clutch and train of gearing though which the shaft 159 is intermittently rotated from the continually rotating shaft 11 will now be described.

Between the intermediate plate 4$^a$ and the left hand end plate 3 of the machine, the shaft 159 has secured to it a gear 200 which meshes with a gear 201 of like size that is loosely mounted upon the shaft 155. The gear 201 is attached to a mutilated gear 202 which meshes with the larger mutilated gear 203, that is secured to the shaft 204. The gear is rigid with two other gears 205 and 206 (see Figs. 2, 10 and 11.) The gear 206 is driven, through an intermediate gear 207 that is carried upon a stub-shaft 208, from a gear 209 which is attached to a clutch 210.

This clutch 210, is, in practically every respect, identical with the main clutch 40, previously described, and shown in detail in Fig. 12. The clutch 210 is operated by an arm 211 which is rigidly attached to a sleeve 212 that is mounted upon the shaft 50. The opposite end of this sleeve carries an arm 213 which projects down alongside the main clutch 40 and is adapted to be engaged by a pin 214 that projects from the side plate 42 of said clutch. The spring 215, which has one of its ends connected to the arm 211 and its opposite end anchored to a post which projects from the side plate 3, tends to hold the arms 211 and 213 in normal position, in which position the latter may be engaged by the pin 214. It will be seen, therefore, that upon each rotation of the main clutch 40, the clutch 210 is operated. It will be observed, from Fig. 4, that the position of the pin 214 with respect to the end of the arm 213 (when the parts are at rest, as shown in said figure) is such as will cause the actuation of the arm 213 and the operation of the clutch 210 after the shaft has been rotated through substantially 180° by one of the toothed portions of the gear 36. With this in mind, it will be remembered that the rack bars, which may have been released, are moved toward the rear of the machine during this half rotation of the shaft 31. The shaft remains quiet while the smooth portion 34 of the gear 36 swings across one of the smooth spots of the gear 32, during which interim the clutch 210 is operated to rotate the shaft 159, through the gearing previously described, to cause the high parts of the cams 96 to be removed from beneath the bearing plates 195, thereby permitting the frame 185 to drop. It may be stated, at this time, that for an interval of time the shaft 159 remains stationary while the longer smooth portion of the cam 203 is traveling over the appropriate smooth spot of the gear 202. It will also be stated at this time, that the dropping of the frame 185 causes the gears of the indicating wheels to mesh with the gears 157 and 160, and they remain in mesh until the rack bars 60 have been brought to normal position by the restoring frame.

The indicating wheels just mentioned are supported by the carriage 186, which comprises a pair of end plates 220 and 221 which are connected at their lower corners by the outwardly opening V-shaped channel rails 222 and 223. The grooves of these rails, with those 190 of the rails of the frame 185, constitute raceways for the balls 224. Thus the carriage 186 is reciprocably supported by the frame 185. Supported by and between the end frames 220 and 221 of the carriage, are front and rear shafts 225 and 226, respectively, and carried by each of these shafts is a sleeve, presently to be described, whereon a set of indicating wheels is mounted. The wheels are referred to generally by the numeral 227, and each comprises a smooth portion 228, which bears a series of digits which are arranged in successive order from zero to nine about the periphery of said smooth portion. To one side of the indicating portion 228, the wheel is provided with a gear 229, and adjacent the gear 229, is a star wheel 230. On the opposite side of the indicating portion 228, each of the wheels is provided with a disk 231, having a pointed finger 232 radiating therefrom. (See Figs. 3 and 20).

The indicating wheels 227 are capable of rotation upon the aforesaid sleeves, and to prevent their being accidentally turned or disarranged while the carriage is elevated and the respective gears 229 of the indicating wheels are therefore out of mesh with the gears 157 and 160, I provide detent pawls 235, for coöperation with the star wheels 230 of the indicating wheels. These pawls are carried upon the shafts 236, that are journaled in the end plates of the carriage. The pawls 235 are pressed, by the spring 237 (see Fig. 3) toward their respective star wheels 230. The pawls are mounted loosely upon the shaft 236, and the springs 237 have their opposite ends connected, one to the adjacent collar 238, and the other to the pawl. The collars are fastened to the shaft, by the screws 239. An arm 240 projects from each of the shafts 236, and carries a friction roller 241 upon its outer end, which is arranged to traverse the rails 242 that are supported from a stationary part of the machine. The rear rail 242 connects the end plate of the machine and constitutes a support for the forward end of the guide plate 66; while the forward rail 242 is carried by brackets 243, one of which rises from the forward upper corner of the right hand end plate 2, and the other from the forward end of the intermediate plate 4ª. It will be seen from the foregoing that, when the carriage is dropped, the arms 240 oscillate the shafts causing them to materially reduce the tension of the springs 237, thereby permitting the wheels 227 to be turned freely by the wheels 157 and 160.

From this description it will be understood that, after the depression of certain of the numeral keys 65, the "adding" key 135 may be depressed and the machine operated to cause the number represented by the depressed keys to be transmitted through the racks 61, pinions 150, gear 151, gear 157 to the rear set of indicating wheels 227, and from gears 157, through the gears 158 and 160, to the forward set of indicating wheels 227. Such an operation will result in the indicating wheels being rotated in the direction of the arrows associated with said wheels in Fig. 7; or, in other words, in the direction of successive progression of the digits or numerals upon the indicating portions of the wheels 227. Now, in order to add to the number appearing upon the indicating wheels a second number, the numeral keys which represent the second number are depressed and the machine is operated as previously described. The indicating wheels will then be turned in the same direction as they are previously turned, a distance corresponding to the second number. Therefore, the sum of the two numbers will appear in the reading line of the indicating wheels. As many numbers as desired may thus be added, to the extent of the machine's capacity.

Attention is now called to the clutch 250, which is mounted upon the right hand end of the continually rotating shaft 14. This clutch is identical with the main clutch 40, as will be seen from an inspection of the detail of the clutch 250, shown in Fig. 16. The actuations of the clutch 250 are under control of a lever 251 which has a projection 252 for coöperation with the tail of the pawl 253, which coöperates with the ratchet 254 that is secured to the shaft 14 within the clutch casing. A spring 255 is shown attached to the rear end of the lever 251 and to a post 256 that projects from the side of the right-hand end plate 2 of the machine, and this spring tends to rock the lever 251 upon its pivot 257 in a direction to cause the same to hold the clutch stationary. The forward end of the lever 251 extends beneath the pin 260 which projects from the side of an extension 261 of the stem 262 of what will be considered the "subtracting" key 263. Projecting from the same edge of the stem 262, and spaced some distance above the extension 261, is a second extension 264. A spring 265 tends to elevate the "subtracting" key and retain the extension 264 against the guide plate 137, whereby the upward movement of the key is limited. The annular edge of the cylindrical casing of the clutch 250 constitutes a cam 266 having a recess 267. The side of the recess 267 is inclined for coöperation with a roller 268 that is carried by the arm 269. This arm is secured to a shaft 270 which is supported in an inclined position adjacent the end plate 2 within the brackets 271 and 272 which extend from said side plate. At its forward end, the shaft 270 carries an arm 273, the free end of which projects alongside a disk 274 that is secured to the shaft 155. From this it will be seen that upon the rotation of the clutch 250 the arm 269 will be swung to rock the shaft 270, causing it, through its arm 273, to shift the shaft 155 longitudinally. In so doing, the gears 151 with their respective pinions 155 will be moved laterally, the gears 151 now meshing directly with the gears 158 instead of the gears 157. Now when the racks 61 are moved forward, the gears 157 and 160 will be driven in a reverse direction to that formerly described, by reason of the fact that they are driven through the intervention of the gears 158. It is obvious that during the remainder of the operation of the machine, the indicating wheels 227 will also be rotated in a reverse direction than formerly explained. From this it becomes apparent that in the operation of subtraction, a number that will constitute the minuend is placed within the machine by depressing the appropriate numeral keys and then operating key 135. The subtrahend is next placed in the machine by depressing the numeral keys which represent the same, and the "subtracting" key is then operated. This results, as aforesaid, in the shifting of the gears 151 and the pinion 150 carried thereby. The subsequent operation of the machine is accomplished by rocking the shaft 50 through the arm 275, which is secured to said shaft, and which projects down alongside the clutch 250 in a position to be rocked by a pin 276 which projects from the side of the clutch casing and is arranged to ride over the lower inclined end of the arm 275 and cam the same to one side. It will be remembered that the oscillation of the shaft 50 causes the arm 49 to be rocked away from the main clutch 40, thereby throwing the entire machine into operation. During the operation it will be understood that the numeral wheels 227 are rotated in the reverse direction to that indicated by the arrows appearing on said wheels in Fig. 7, thereby returning them toward their original position a distance corresponding to the subtrahend. The result now appearing upon the reading line of the indicating wheels represents the remainder.

To prevent the depression of the "subtracting" key at the time the "adding" key 135 is depressed, I provide a gravity lock 277, which is pivoted to the brace 139, and has a lateral extension which lies over the upper edge of the arm 144 that is arranged to be actuated by the "adding" key. Normally the lock is retained, by the arm 144, in a position with its upper end from beneath the extension 264 of the stem of the "subtracting" key; but upon the depression of the "adding" key and the lowering of the arm 144, the weighted lateral extension of the lock 277 causes it to swing upon its pivot with its upper end beneath the extension 264, thus effectively locking the "subtracting" key against depression.

The "ten-carrying" mechanism will now be described, and reference will be made particularly to Figs. 7 and 19 to 28. As is well understood, the object of the "ten-carrying" mechanism is to allow each indicating wheel to be rotated one digit upon the complete rotation of the wheel adjacent to it of the next lower order. Thus, when any one wheel passes from "nine" to "nought" or something thereabove, the wheel to the left of it will be advanced one digit. The sectional details shown in Figs. 20, 22 and 24, are taken as looking toward the left hand end of the machine. Upon the shafts 225 and 226, are shown the indicating wheels 227, and the disks 231 that are included in said figures are those of the wheels which have been removed by the section, and which occur at the right of the indicating wheels 227 that are shown, Figs. 19, 21 and 23 are sectional plan views that are represented by the correspondingly numbered lines of Figs. 20, 22 and 24.

Slidably mounted upon the shafts 156 and 161, between their respective adjacent gears 157 and 160, are elements which will be referred to hereinafter as the carriers, and indicated generally at 280. As shown in the perspective in Fig. 27, each of the carriers comprises a hub section 281 from one end of which laterally extend the points 282. Within recesses 283, formed within the end face of the hub 281 remote from the points 282, are contained spring-pressed plungers 284 which bear against the adjacent face of the gears 157 or 160, whichever the case may be (see Fig. 19). These spring-pressed plungers tend to slide the carriers to the left, or into the plane of the star wheel of the indicator that is directly above it. Ordinarily the carriers are retained in normal position, with their points 282 out of the plane of the star wheels above, by means of the bell crank levers 285, the lower ends of which are turned laterally, as shown at 286 (Fig. 28) and bear upon the end of the hub portions of the carriers. The bell crank levers 285 are journaled upon the shafts 287 which are supported in the end frame 2 and the intermediate plate 4ª, and are rocked in a direction to elevate their free ends 286, by springs 288, which have their upper ends connected to the hubs of the bell crank levers, at 289, and their lower ends anchored to rods 290 which are conveniently supported by links 291 (Figs. 6 and 7), from the shafts 287. The upper arms of the bell crank levers have pins 292 which project laterally therefrom into slots 293 of the arms 294 which are mounted upon the shafts 295. The ends of the shafts 295 project through slots 296 in the right hand end plate and the intermediate plate 4ª, and beyond each of said plates there is located means for moving the shafts 295 vertically within the slots 296. The means referred to consists of a plate 297 which has inclined slots 298 for the reception of the ends of the shaft 295. The two plates 297 are identical, and in Fig. 4, one of these plates is clearly shown as supported from the intermediate plate 4ª upon the screws 299 which project through the slots 300 that are formed in said plate. A portion 301 of each of the plates 297 extends downwardly and rearwardly from the front portion of the plate, toward the shaft 159; and a cam 302, that is secured to the shaft adjacent each of the extensions 301, coöperates with said extension to move the plate forwardly and thus through the inclined slots 298, lower the shafts 295 for a purpose which will be presently explained. Springs 303 are employed for restoring the plates 297 to normal position.

Returning now to the arms 294 it will be stated that these arms are located in the vertical plane of the disks 231 and their free ends are arranged to be depressed by the points of the said disks in the "ten-carrying" operation.

Let it be assumed that, while the carriage is down, in the regular operation of the machine, one of the indicating wheels has been rotated beyond the digit 9. The relation of this digit with respect to the point of the disk 231 of the same wheel, is such as will cause it to ride over the end of the arm 294 while the digit 9 is passing from the reading line. The arm 294 will therefore be depressed and, through its connection with the bell crank lever 285, cause said lever to be swung upon the shaft 287 and its lower end 286 removed from the end of the hub section of the carrier. Thereupon, the spring pressed plungers 284 will shift the carrier to the left with its points 282 in the plane of the star portion of the next adjacent indicating wheel. It will be noted that one side of each of the shafts 156 and 161 is flattened to correspond to the flattened side of the hole through each carrier, whereby the carriers are rotated upon the rotation of the shafts. The mechanism through which these shafts are rotated will be described later. It will be mentioned at this time, however, that in the operation of the machine these shafts and the shafts 305 are each given a complete rotation.

Slidably mounted upon the shaft 305 are shifting forks 306 which project down alongside the hub portions of the carriers and are adapted to engage the shoulders 307 that are formed between the larger and smaller sections of the hub portions. The hub 308 of the shifting forks have projections 309 that extend longitudinally therefrom, one face whereof is inclined as shown in the plan views in Figs. 19, 21 and 23. Arranged to coöperate with the projection 309 of each of the forks, is a like projection 310 which extends from the side of a collar 311 that is pinned to the shaft 305. Thus, upon each rotation of the shaft 305, the projection 310 rides over the projection 309 and slides the forks 306 upon the shaft. The shifting forks 306 tend to be moved toward the collar 311 by a spring pressed rod 312 which is grooved for coöperation with the underneath edge of the central portions of the forks and is spring pressed toward the left by means of a spring which surrounds the right hand end of the shaft and is interposed between a collar 313, and the adjacent portion of the end plate of the machine through which the rod passes (see Fig. 29). It will be understood that one of the sets of points of the carriers are used when the machine is adding, and the other when subtracting. For the reason that the indicating wheels are turned in the reverse direction when subtracting than they are when adding, it is of course necessary that the shafts 156 and 161 also be rotated in a reverse direction when subtracting than when adding. The gearing through which this is accomplished will be described farther along.

It will be understood that the points of the carriers which are used for adding are arranged progressively above the shaft whereon the carriers are mounted, throughout the successive carriers, the angular distance between adjacent points of the successive carriers being one-tenth of the circle described by them. This may be expressed also by saying that the various points are arranged spirally about the shaft. It is obvious that the direction of the spiral described by the points that are used in adding will be of the opposite inclination to that defined by the points which are used in subtracting. Or it may be said, as a matter of illustration, that one spiral corresponds to the thread of a right hand screw while the other corresponds to the thread of a left hand screw. It follows from this that where the lines defined by the spirally arranged points cross each other only one point will appear upon the carrier. Now the various collars 311 will have one or two projections 310 in accordance with the number of points that are possessed by the carrier that is slid by said collar through one of the shifting forks 309. This is for the obvious reason that if the second projection were not employed there would be two points acting, in many cases, upon the indicating wheel and thereby advancing said indicating wheel two digits instead of one. The second projection of the collar throws the carrier out of alinement with the star wheel when the inappropriate point is passing the same.

With reference to Fig. 5 and Figs. 10 and 11, I have described how the shaft 159 is rotated from the gear 209, that is carried by the clutch 210. It will be recalled, also, that the gear 206 is pinned to the shaft 204. The shaft 204 projects through the left hand end plate 3 of the machine and beyond said plate has secured to it the mutilated gear 315 which may be seen in full lines in Fig. 2 and in dotted lines in Fig. 5. This gear meshes with a gear 316, the sleeved hub of which is mounted upon the end of the shaft and projects through the end plate 3 where it is provided with a gear 318 which meshes with the gear 319 that is fastened upon the end of the shaft 305 (see Fig. 31). Thus it will be seen how the shaft 305, which carries the shifting forks and the collars 311 which operates said fork, is rotated.

In the case of addition, the shafts 156 and 161, which drive the carriers 280, are turned to the left, as viewed in Figs. 5 and 19 to 24, through the following gearing. The gear 205, previously described as being located between the gears 203 and 206, drives mutilated gear 320, that is splined to the shiftable shaft 155, as shown in Fig. 32. Mounted loosely upon the shaft 155, between gear 320 and the left hand end plate 3 of the machine, are two gears 321 and 322. It will be seen that each of these gears is provided with a hub, the opposed faces of which have notches, that of the gear 321 being shown at 323, and the notch of the gear 322 being shown at 324. A pin 325 projects laterally from the shaft 155 and is adapted to occupy either one or the other of the notches, according to the position of the shaft. Now, under conditions when the machine is intended to add, the pin 325 occupies the notch 323 of the gear 321, causing said gear to be rotated with the shaft 155 which, it will be recalled, is driven through the gear 320. The gear 321 drives a gear 326, which is rigid with the sleeve 327, loosely mounted upon the shaft 159. Secured to the opposite end of this sleeve 327 is a gear 328, which meshes with both the gear 329 that is fastened to the shaft 161, and a gear 330 that is secured to the shaft 156. It will be seen from this that, under the conditions described, the gears 329 and 330 and consequently the shafts 156 and 161 will be driven in the direction indicated by the arrows in Fig. 5. Attention is now directed to the fact that the gear 330 is considerably wider than the gear 328, and it will be observed from Fig. 2, that the gear 328 meshes with that side of the gear 330 toward the left hand end of the machine. The other zone of the gear 330 is in mesh with the previously mentioned gear 322.

In the case of subtraction, the shaft 155 is shifted to transfer the pin 325 from the notch of the gear 321 to that of the gear 322. In the subsequent operation of the machine, gear 322 will be rotated with the shaft 155 and, by reason of its meshing directly with the gear 330, will rotate said gear in the direction opposite to that previously set forth, or that indicated by the arrow in Fig. 5. Also, gear 329 will be driven in a reverse direction than heretofore, through the intervention of the gear 328.

Secured to the shaft 156 between the gear 330 and the adjacent end plate of the machine, (Fig. 9) is a pinion 335 which drives, through an intermediate gear 336 that is mounted upon a stud 337 a pinion 338 which is secured to a short shaft 339, journaled within the intermediate plate 4 and end plate 3. This shaft is splined at 340, and adapted to slide upon it is a collar 341 (see Fig. 4) having a tooth 342, said collar having a key 357 that is received by the spline 340. The tooth 342 is arranged to coöperate with the star wheels 343 that are carried by the indicator wheels 344. It will be noted that these indicator wheels have a zero point from which numerals progress in each direction from 1 to 9, the 9 of each wheel being diametrically opposite the zero. Too free a rotation of the indicator wheels is prevented by the detent pawls 345, one of which coöperates with the star wheel of each of the indicating wheels, and is pressed toward the same by means of the springs 346, the general construction being similar to that of the indicator wheels of the carriage. The set of indicator wheels 344 constitute a counter which is operated upon each operation of the machine, and which is of particular importance in the operation of multiplication and division.

In Figs. 7 and 8 I have shown a rack 347 which is supported by the arms 348, from the rear rail 223 of the carriage. This rack coöperates with a gear 349 which has formed integral with it a pinion 350, both of which are mounted upon a stud 351 which projects from the upper edge of the rail 190 of the frame 185. Slidably carried by the rail 190 is a rack 352 which meshes with the pinion 351, and the right hand end of an extension 353 (as viewed in Fig. 8) is turned inward to enter a circumferential groove 354, in the collar 341. The ratio of the gear 349 to the pinion 350 is the same as the ratio of the distances between the respective indicating wheels of the carriage and those of the counter.

The carriage is drawn toward the left by a spring 360, that is housed within the drum 361 and has one of its ends attached to the cylindrical wall of the drum and its other end to the shaft 362 whereon said drum is mounted. A sleeve 363, which is rigid with the drum, carries, at its rear end, a ratchet 364. The shaft 362, whereon the drum, the sleeve and the ratchet are rotatably supported, is fixed in the end of the brackets 365 which are fastened to the end of plate 3. A cable 366 has its end secured to the periphery of the drum 361, and passes over the pulley 367 that is rotatably supported by a bracket 368 which is attached to the right hand end plate 2. The upper stretch of the cable 366 is divided for the insertion of two eye bolts 369 which pass through a lug 370, and are adjustable therein by means of the nut 371, for the purpose of tightening the cable. The lug 370 extends from the front rail of the carriage and overhangs the rail 190. By leading the cable over the pulley 367, the same may be kept perfectly tight and the movements of the carriage under perfect control.

The carriage is caused to travel step-by-step toward the left, by mechanism which will now be described. It being desirable to arrest the movement of the carriage at each step with its indicating wheels directly in front of the banks of keys, so that it will be perfectly clear to the operator upon what indicating wheels will appear the number represented by the keys he has depressed. The relative arrangement of the gears of the indicating wheels, the gears below with which they mesh, and the train of transmission gearing to the rack 61, is such as will bring about this desired location of the indicating wheels with respect to the key banks. The successive teeth of the ratchet 364 are the proper distance apart to allow the carriage to travel the distance corresponding to that between consecutive indicating wheels, when said ratchet is permitted to rotate the distance corresponding to the spacing of its teeth.

As will be seen in Figs. 17 and 18, a pair of pawls 375 and 376 are contained within a casing 377 which is rigid upon the shaft 378. The pawl 375 is pivoted to the wall of the casing and is spring drawn toward the left, so that when the shaft 378 is rocked slightly forward, said pawl will pass from in front of the teeth of the ratchet 364 and, by reason of its spring, will be advanced toward the left, as shown in Fig. 18, while the ratchet is held against rotation by the stationary tooth 376. Now, upon the turning of the shaft in the opposite direction, the stationary pawl will be withdrawn from in front of the tooth of the ratchet allowing the ratchet to rotate until the next successive tooth engages the pivoted pawl 375. This will cause the pivoted pawl to be returned to alinement with the stationary pawl where it will remain until the shaft 376 is again rocked forward. A spring 379, which is coiled about the left hand end of the shaft 378, has one of its ends connected to the shaft and the other bearing upon the base of the machine, tends to rotate this shaft in a direction to move the casing 377 toward the rear, or the pivoted pawl 375 into the plane of the ratchet 376.

The rocking of the shaft 378 against the tension of the spring is accomplished, in one instance, by the "space" key that is located forward of the "adding" key. The "space" key is designated 380, and as will be seen clearly from Fig. 6, it is guided in the upper guide plate 178 and in the forward end of the lower guide plate 138, and is elevated by the spring 381. The lower end of the stem 382 has a pin 383 which extends laterally therefrom over the free end of an arm 384 which is fastened to a shaft 385, which shaft is journaled in the end plate 2 and in the intermediate plate 4. Beyond the left hand side of plate 4, the shaft 385 has attached to it an arm 386 which has its free end coupled, through the link 387, with the upper end of an arm 388 that is secured to the aforesaid shaft 378 (see Fig. 4). Therefore it will be seen that, upon the depression of the key 380, the carriage will be caused to travel one step toward the left under the influence of the spring 360.

In some cases it is desirable to cause the carriage to travel the full limit of its left hand movement upon a single oscillation of the shaft 378, and this is accomplished by a key 390 which is mounted within the casing of the machine and is guided through a hole therein and an aperture in the lower end of a bracket 391 which depends from the casing adjacent the stem 392 of said key. The key is retained in elevated position by a spring 393, and its lower end has a lateral pin 394 which is arranged to engage the free end of an arm 395 which is secured to the shaft 378. Upon the depression of the key 390, the shaft is rocked to such an extent that both pawls 375 and 376 are withdrawn from the ratchet 364, whereupon the same will be free to rotate until the carriage has reached the left hand limit of its movement. In order to avoid the carriage traveling too rapidly, and the sudden jar which would result therefrom when the same would reach the end of its movement, a brake is provided which comprises a plate 396 that extends upward, from, and is carried by the casing 377 and has, at its upper end, a friction shoe 397 that is arranged to bear against the rear smooth surface of the ratchet 364. By this means the rotation of the ratchet is retarded and the movement of the carriage controlled.

A handle 398 rises from the right hand end of the carriage and provides a convenient means for moving the carriage toward the right against the tension of the spring 360. The casing 5 which has been previously described as substantially square in plan, covers the entire machine and its lower edge rests upon the edge of the base 1. The casing is provided with three series of sight openings, two of which are indicated at 401, and the other at 402. Through the former openings 401, the indicator wheels of the carriage may be observed, and through the latter, the indicating wheels of the counter expose their reading line.

In computations involving decimal points and other marks of division, I have provided the indicating devices 403 for the purpose of locating said points within the reading lines of the carriage indicating wheels, and a like pointer 404, coöperating with the indicating wheels of the counter. The former are slidable upon a rod 405 which is supported from the top of the casing, and the latter upon a rod 406 that is also supported from the casing, forward of the openings 402. A slot 407 is formed in the casing adjacent the front row of openings 401, and has a scale, bearing indications of the seven steps which are capable of being made by the carriage in its travel. To indicate the location of the carriage with respect to these marks, I provide a finger 408 which rises through the slot 407 and is supported from the front rail of the carriage.

In Figs. 2 and 4 there is shown a ratchet 410 that is secured to the shaft 11 adjacent the main clutch 40. A pawl 411 is pivoted to the side of the clutch casing and is pressed into engagement with the ratchet by a spring 412. The function of this pawl and ratchet is to prevent the clutch casing from being rotated more rapidly than the shaft 11 during the operation of the machine, which might occur if a number of the rack bars 60 were released at the same time and the combined energy of their springs 63 was brought to bear upon the rearward tie rod 24 of the restoring frame, thereby forcing said frame to the rear of the machine and causing it, through the lower racks 29 and coöperating mutilated gears 30 to rotate the shaft 31, with its gear 32, and finally the gear 36 which is carried by the clutch casing.

Figure 36:
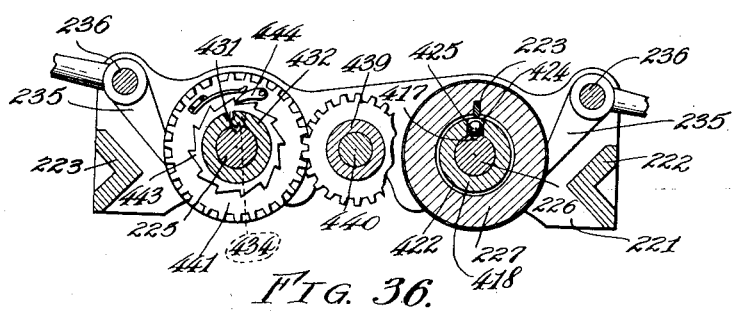

The method of supporting the indicating wheel of the computing heads, as well as means for "clearing" such heads, or in other words, for setting the indicating wheels to zero, is illustrated, in detail, in Figs. 35 and 36. The previously mentioned shaft 226 has one of its ends fixed within the end plate 221 of the carriage, said shaft extending toward the opposite end plate 220 and terminating a short distance therefrom. A V-shaped groove 417 extends from one end to the other of the shaft, and is preferably located on the top side thereof. A sleeve 418 is mounted upon the shaft 226, and this sleeve is of a length substantially equal to the distance between the end plates of the carriage. A stub shaft 419 has one of its ends inserted into the end of the sleeve 418, adjacent the free end of the shaft 226, and the stub shaft may be secured against relative rotation with respect to the sleeve by any suitable means, as by a pin 420. The stub shaft is journaled within an aperture in the end plate 220, and beyond the plate, has secured to it the hub of an operating handle or crank 421. The indicating wheels 227, with their associated gears, etc., are loosely mounted upon the sleeve 418, a portion 422 of each wheel being spaced a slight distance from the surface of the sleeve. A substantially radial fin or rib 223 is carried by each indicating wheel in a position to extend across the space between the portion 422 of the wheel and the opposed surface of the sleeve, the adjacent face of the fin approaching very close to the sleeve. Within the zone of the fin of each wheel, the sleeve 418 is provided with an aperture 424, for the reception of a ball 425, that is of a diameter substantially equal to the distance between the opposed surfaces of the portion 422 of the indicating wheel and the shaft 226.

The above relates to the sub-total head, or that computing head that is located farthest from the front of the machine. The indicating wheels of the other or grand-total head are mounted in substantially the same manner, the stationary shaft by which they are supported being indicated at 225. This shaft extends through both end plates of the carriage and is fixed against rotation. The shaft 225 is provided with a groove 431, and supports a sleeve 432, having apertures 433 which contain balls 434 for coöperation with the fin 435 of the indicating wheel.

A gear 437 is secured, by means of a key 438, to the end of the sleeve 418, adjacent the end plate 220 of the carriage. This gear meshes with an idler 439 that is journaled upon a stub shaft 440, carried by said end plate. This idler in turn, meshes with a gear 441 that is loosely mounted upon the sleeve 432 adjacent the end one of the indicating wheel. A ratchet 443 is secured to the sleeve 432 between the gear 441 and the end plate of the carriage; and coöperating with this ratchet is a spring pressed pawl 444, that is pivoted to the side of the gear 441.

From the foregoing construction, it is obvious that, when the sleeve 418 is rotated, it will carry the balls 425 about the shaft 226, said balls engaging and picking up any of the fins 422 that are out of normal position. The balls will continue to rotate the wheels through the aforesaid fins until the balls reach the groove 418 of the shaft 226, when said balls will drop by gravity into said groove and pass beneath the bottom face of the fins; the groove allowing the retraction of the balls to within the circumference of the sleeve 418. It is clear, also, that the aforesaid result will be accomplished regardless of the direction in which the sleeve is rotated by the operating handle or crank 421. Therefore, when the crank 421 is rotated in either direction, the "clearing" mechanism will operate to set the indicating wheels of the sub-total head to zero. When the sleeve 418 is rotated, it will impart rotation to the gear 441, through the gear 437 of the former sleeve and idler pinion 439. When rotating in one direction, the gear 441 becomes locked to the sleeve 432, through the pawl 444 and ratchet 443. From this it follows that when the operating handle or crank is rotated in one direction, it operates only the wheels of the sub-total head, having no effect upon the indicating wheels of the grand-total head; but when rotated in the other direction it acts to set the wheels of both heads to zero position.

In order to prevent the balls 425 and 434, from interfering with the normal operation of the indicating wheels, it is necessary that these balls normally repose with their respective grooves 417 and 431. Consequently, the operating handle 421 must have a fixed normal position, and such position is determined by the coöperation of a spring pressed plunger 450, that is carried by the free end of the operating handle, and a notch 451 that is formed in the protruding end of the shaft 225.

In order that the use of the machine may be thoroughly understood, I will describe its operation in the performance of simple examples in addition, subtraction, multiplication and division. Assuming that it is desired to add 666 and 222, the "6" keys in three successive banks are depressed, and the machine operated by the depression of the adding key 135. This results in the numerals 666 appearing through those openings 401 of the casing which correspond to the key banks wherein the aforesaid keys were depressed. Now the "2" keys in the same banks are depressed and the machine operated as aforesaid which will result in 888 appearing through the aforesaid openings of the casing, such representing the sum of the numbers added. It is obvious from the foregoing that other numbers may be added to the sum, and it is also clear that said sum will appear through both sets of openings 401. It will be further assumed that the sum represents only a sub-total. After the sum has been taken from the sub-total head, its indicating wheels may be returned to normal position by the turning of the crank 416 in an appropriate direction. Another group of numbers may now be added, the sum whereof accumulates upon the sub-total head, while such sum is being added to that appearing upon the grand-total head.

A problem in subtraction will now be considered. Let it be assumed that the minuend is 888. The "8" keys in three successive banks are depressed and the machine operated to place this number upon the indicating wheels of the computing heads. It will be supposed that the subtrahend is 222. The "2" keys of the aforesaid banks are depressed and the subtracting key 263 is actuated to operate the machine. In this event, the indicating wheels of the computing heads are caused to rotate in the reversed direction than that in which they rotate in the case of addition, resulting in 666 appearing through the openings of the casing, which number represents the difference or remainder.

In cases of multiplication and division, when it is necessary to maintain certain of the keys depressed which represent, in the respective computations, the multiplicand and the divisor, it is required that the "repeat" key 115 be depressed for the purpose of holding the former keys down during the subsequent operations of the machine, as will appear from the following explanation of performances of the aforesaid nature.

In the case of multiplication, the multiplicand is placed in the machine by depressing the keys which represent such element, the depression of the repeat key 115, and subsequent operation of the machine by the depression of the adding key 135. Let it be considered that the multiplicand is 555, and that it is desired to multiply it by 25. The carriage is moved at least one order to the right from its extreme left hand position, by means of the handle 398. With the parts in this condition, the adding key 135 is depressed and held down until two cycles of operation have been completed, as will be shown by the indicating wheel of the counter which corresponds to the order or indicating wheel of the carriage that is in alinement with the key bank which represents the units order of the multiplicand. The 2 appearing on the indicating wheel of the counter represents the tens order of the multiplier. Now, upon the depression of the spacing key 380, the carriage is caused to travel to the left one step, or until the indicating wheel that was formerly in alinement with the bank of keys representing the units order of the multiplicand, reposes in front of the key bank which represents the tens order thereof. Upon such a shift of the carriage, the indicating wheel of the counter to the right of the one formerly operated will be thrown into operative connection with the indicating wheels of the computing heads. Now the adding key 135 is again depressed and held down during five cycles of operation and until 5 appears upon the aforesaid indicating wheel of the counter, so that the counter now displays 25 which, as already mentioned, represents the multiplier. The result appearing through the openings 401 of the casing, represents the product.

As an example in division, we will assume that 425 is to be divided by 25, the carriage is moved toward the right from its extreme left hand position. 425 is placed in the machine in the manner already described in connection with the foregoing examples. The counter is cleared, and keys representing 25 are depressed so that the tens order thereof will be in alinement with the 4 of the number appearing on the computing heads, and representing the dividend. The subtracting key is now depressed which will cause the indicating wheels of the computing heads to be turned in a direction to cause the aforesaid dividend to be reduced to 175, this result being accomplished by subtracting 25 from 42, as in an ordinary example in division. It will be seen at a glance that 25 will not be contained in 17, so the space key is operated to shift the carriage to bring the 7 in alinement with the tens order of the divisor 25. The adding key is again depressed and held down until seven cycles of operation are performed which will result in the computing heads being cleared. During this operation, the counter has been operated to show the numeral 1 upon one wheel and 7 upon the next adjacent wheel. The quotient, therefore, is 17. It has already been explained that the indicating wheels of the counter are provided each with 2 series of indications or numerals. This is for the obvious reason that when performing multiplication the wheels are rotated in a direction opposite to that in which they are rotated when performing division.

Having thus described my invention, what I claim is:—

1. The combination of a plurality of racks having each a series of projections, a series of plungers that are severally movable into the path of the aforesaid projections of each rack, means for moving the rack in a direction to coöperate with the plungers, mechanism for restoring the racks to normal position, gearing that is continually in mesh with and is driven by each rack, a series of indicating wheels, a carriage for said wheels that is movable so as to bring the indicating wheels into coöperation with the aforesaid gearing, mechanism for so moving the carriage, a driving element, a clutch for operatively connecting the driving element to the aforesaid mechanisms, and means for actuating said clutch.

2. The combination of a plurality of racks having each an abutment, a series of plungers for each rack that are severally movable into the path of the abutment of said rack, means tending to move each rack in a direction to cause its abutment to engage the aforesaid plungers, transmission gearing that is continually in mesh with and is driven by each rack, a computing head comprising a series of indicating wheels, a carriage for supporting said wheels, mechanism for moving said carriage to bring the indicating wheels into coöperation with the aforesaid transmission gearing, further mechanism for restoring the aforesaid rack, a driving element, a clutch for operatively connecting said element to the aforesaid mechanisms, and means for actuating said clutch.

3. The combination of a plurality of racks having each an abutment, a series of plungers associated with each rack and severally movable into the path of the abutment of said rack, means tending to move each rack in a direction to cause its abutment to engage the aforesaid plungers, mechanism for restoring the racks after such movement, means for restoring the plungers to normal position, further means for maintaining the aforesaid plunger restoring means ineffective, means for locking the racks in normal position, connections between each plunger and the locking means for the rack wherewith it is associated for unlocking the rack when said plunger is depressed, gearing that is driven by each rack, a computing head comprising a series of indicating wheels, a carriage whereby said head is supported, mechanism for moving said carriage to cause the indicating wheels to coöperate with the transmission gearing when the rack is traveling in one direction, a counter for indicating successive reciprocations of the rack, a driving element, a clutch for operatively connecting said element to the rack restoring mechanism and the carriage moving mechanism, and means for actuating said clutch.

4. The combination of a plurality of reciprocable racks having each a series of abutments, a bank of plungers associated with each rack and severally movable into the path of the abutments thereof, means for moving each rack in a direction to cause its abutments to approach the plungers, mechanism for restoring said racks, transmission gearing driven by each rack, said gearing involving a shiftable reversing gear, a computing head comprising a series of indicating wheels, a carriage supporting said head, mechanism for moving said carriage to bring the indicating wheels into coöperation with the transmission gearing when the aforesaid racks are traveling in one direction, a counter comprising a series of indicating wheels that are rotatable in each direction from normal position, operative connections between the transmission gearing and said wheels whereby said wheels of the counter will be actuated upon each operation of the transmission gears, means for shifting the aforesaid reversing gear, means for locking the aforesaid racks in normal position, operative connections between the plungers and said locking means for rendering said locking means ineffective when any one of the plungers of a bank is in operative position, means for restoring the plungers to normal position, further means opposing the plunger restoring means thereby to retain the plungers in operative position, a driving element, a clutch for operatively connecting said element to the rack restoring mechanism and the carriage moving mechanism, and means for actuating said clutch.

5. In a machine of the character set forth, the combination of a plurality of racks, a train of gearing operated by each rack a series of indicating wheels movable into and out of coöperation with said gearing, means tending to move the racks in one direction, mechanism for restoring said racks to normal position, further mechanism for moving the indicating wheels into operative relation with the said gearing when the racks are moved in one direction, a series of plungers for each rack that are severally movable into the path of said rack thereby to limit is movement in one direction, a stop bar movable longitudinally of each series of plungers, said bar being provided with a stop for each plunger, each plunger having a shoulder for coöperation with its stop whereby said plunger may be retained in effective position, springs tending to retain the plunger in effective position, a rock shaft that is operatively connected to the stop bars thereby to shift said stop bars upon an oscillation of the shaft to release the plungers, an arm having connection with said shaft and movable in one direction to rock the shaft and thereby release the plungers, said arm being movable in the opposite direction independently of the shaft, a driving element, operative connections between said element and the aforesaid mechanisms, said connections involving a rotatable member having a projection into the path of which the aforesaid arm normally reposes thereby to swing the arm and oscillate the aforesaid shaft upon a rotation of said member, and means for removing the arm out of the path of said projection.

6. The combination of a plurality of reciprocating elements, mechanism for reciprocating said elements, selective means for determining the extent of movement of said elements, transmission gearing in operative connection with said elements, two sets of computing devices, a supporting structure for both of said sets of computing devices that is movable to bring both sets of devices simultaneously into operative connection with the transmission gearing, and driving mechanism which effects an operation of the reciprocating mechanism and which also effects the aforesaid movement of the supporting structure during the movement of the elements in one direction.

7. The combination of a reciprocable element, mechanism for reciprocating the element, selective means for determining the extent of movement of said element, computing devices, transmission gearing having operative connection with the reciprocable elements and involving a shiftable reversing gear, means for moving the computing devices into operative connection with said gearing when the aforesaid elements are moved in one direction, constantly acting driving means, a clutch for coupling the driving means with the element-reciprocating mechanism and with the means for moving the computing devices, mechanism for shifting the aforesaid shiftable gear, a second clutch for coupling said gear shifting mechanism to the driving means, means for actuating the second clutch, and operative connections between the first and second clutches whereby the first clutch is operated by the second clutch.

8. The combination of a reciprocable element, mechanism for reciprocating said element, selective means for determining the extent of movement of said element, transmission gearing having operative connection with said element and involving a shiftable gear through which said gearing may be reversed, a computing device movable into coöperation with said gearing, mechanism for so moving said device when the aforesaid element is moved in one direction, driving means, normally ineffective connections between the driving means and the mechanisms whereby the aforesaid element is reciprocated and the computing device is moved, mechanism for shifting the aforesaid shiftable gear, normally ineffective connections between the driving means and the gear shifting mechanism, means for rendering the last named connections effective, and mechanism through which the last named connections render the first mentioned connections effective.

9. The combination of a reciprocable element, mechanism for reciprocating said element, selective means for determining the extent of movement of said element, transmission gearing in operative connection with said element, said gearing involving a shiftable reversing gear, an indicating device, mechanism for moving said device into coöperation with the transmission gearing, a constantly acting driving means, a clutch through which said means is coupled with the element-reciprocating mechanism and the indicating device-moving mechanism, means for shifting the aforesaid shiftable gear, a second clutch that is adapted to be coupled with the driving means, said clutch involving a cam for actuating the gear shifting mechanism, means for operating said clutch, and connections through which the second clutch operates the first clutch.

10. The combination with a plurality of racks having each a series of projections, a series of plungers that are severally movable into the path of the aforesaid projections on each rack, means for moving the rack in a direction to coöperate with the plungers, mechanism for restoring the racks to normal position, gearing that is continually in mesh with and is driven by each rack, a series of indicating wheels registering sub-totals, a second series of indicating wheels registering grand totals, means connecting said sub-total indicating wheels and said grand total indicating wheels, a carriage for both sets of indicating wheels that is movable to bring both sets of indicating wheels into coöperation with the gearing, and means for so moving said carriage.

In testimony whereof I hereunto affix my signature in the presence of two witnesses.

ADOLPHUS S. DENNIS.

Witnesses:
JOHN F. RULE,
HAROLD E. SMITH.